United States Patent
Hester et al.

(10) Patent No.: US 10,703,155 B2
(45) Date of Patent: Jul. 7, 2020

(54) MULTI-FUNCTIONAL SUSPENSION BUSHING

(71) Applicant: Hendrickson USA, L.L.C., Itasca, IL (US)

(72) Inventors: Donald R. Hester, East Canton, OH (US); R. Scott Fulton, Hudson, OH (US); Ross Leonard, Medina, OH (US); Randy J. Zimmerman, Spencerville, IN (US); James J. Patterson, North Canton, OH (US)

(73) Assignee: Hendrickson USA, L.L.C., Itasca, IL (US)

( * ) Notice: Subject to any disclaimer, the term of this patent is extended or adjusted under 35 U.S.C. 154(b) by 86 days.

(21) Appl. No.: 15/999,165

(22) Filed: Aug. 16, 2018

(65) Prior Publication Data
US 2019/0054786 A1 Feb. 21, 2019

Related U.S. Application Data

(60) Provisional application No. 62/546,161, filed on Aug. 16, 2017.

(51) Int. Cl.
*B60G 7/02* (2006.01)
*B60G 7/00* (2006.01)
(Continued)

(52) U.S. Cl.
CPC ............. *B60G 7/02* (2013.01); *B60G 3/145* (2013.01); *B60G 7/001* (2013.01); *B60G 9/003* (2013.01);
(Continued)

(58) Field of Classification Search
CPC .... B60G 2204/4104; B60G 7/02; B60G 7/04; B60G 3/145; B60G 7/001; B60G 9/003;
(Continued)

(56) References Cited

U.S. PATENT DOCUMENTS 2,352,446 A   6/1944  Pointer
2,958,526 A   11/1960 Ulderup et al.
(Continued)

FOREIGN PATENT DOCUMENTS

EP   378023 B1    7/1990
FR   1346182 A    12/1963
(Continued)

OTHER PUBLICATIONS

Translation of JP-2001271882-A (Year: 2001).*

*Primary Examiner* — Paul N Dickson
*Assistant Examiner* — Kurtis Nielson
(74) *Attorney, Agent, or Firm* — Dureska & Moore, LLC; David P. Dureska; Greg Strugalski

(57) ABSTRACT

A bushing for use in an axle/suspension system of a heavy-duty vehicle. A beam supports an axle for pivotal movement with a hanger of the heavy-duty vehicle at a pivot connection. A bumper is fixed to the beam and contacts an engagement member of the heavy-duty vehicle to limit the relative pivotal movement of the beam and axle in one direction. A force is applied to the pivot connection in a force application direction that is angularly spaced from horizontal and vertical planes. The pivot connection includes a bushing to connect the beam and the hanger. The bushing includes an elastomeric bushing body with at least one void for decreasing rigidity of the bushing body in a substantially vertical direction. The one void is located in the bushing body angularly spaced from the force application direction. The bushing body is substantially solid along the force application direction.

22 Claims, 17 Drawing Sheets

(51) Int. Cl.
*F16F 1/387* (2006.01)
*B60G 11/62* (2006.01)
*B60G 3/14* (2006.01)
*B60G 9/00* (2006.01)

(52) U.S. Cl.
CPC ............ *B60G 11/62* (2013.01); *F16F 1/3873* (2013.01); *B60G 2200/31* (2013.01); *B60G 2202/143* (2013.01); *B60G 2202/152* (2013.01); *B60G 2204/41* (2013.01); *B60G 2204/4104* (2013.01); *B60G 2204/41042* (2013.01); *B60G 2204/4302* (2013.01); *B60G 2204/4306* (2013.01); *B60G 2204/4502* (2013.01); *B60G 2300/026* (2013.01); *B60G 2300/042* (2013.01)

(58) Field of Classification Search
CPC .............. B60G 11/62; B60G 2300/026; B60G 2204/41042; B60G 2202/143; B60G 2204/4502; B60G 2300/042; B60G 2200/31; B60G 2202/152; F16F 1/3873; F16F 1/387; F16F 1/38
See application file for complete search history.

(56) References Cited

U.S. PATENT DOCUMENTS

| | | | |
|---|---|---|---|
| 3,147,964 A * | 9/1964 | Wolf | F16F 1/387 267/292 |
| 3,594,892 A | 7/1971 | Stewart | |
| 3,762,747 A | 10/1973 | Griffen | |
| 3,966,223 A | 6/1976 | Carr | |
| 4,157,227 A | 6/1979 | Hahle | |
| 4,166,640 A | 9/1979 | Van Denberg | |
| 4,732,407 A | 3/1988 | Oyama et al. | |
| 4,991,868 A | 2/1991 | Van Denberg | |
| 5,013,012 A | 5/1991 | Jouade | |
| 5,203,585 A | 4/1993 | Pierce | |
| 5,251,886 A | 10/1993 | Bursel | |
| 5,531,426 A | 7/1996 | Bruhl | |
| 5,865,429 A * | 2/1999 | Gautheron | F16F 1/3835 267/141.2 |
| 5,996,981 A * | 12/1999 | Dilling | B60G 7/02 267/153 |
| 6,446,993 B1 | 9/2002 | Huszarik et al. | |
| 7,464,948 B2 | 12/2008 | Ramsey | |
| 8,459,666 B2 | 6/2013 | Piehl et al. | |
| 9,610,820 B1 * | 4/2017 | Chen | B60G 15/04 |
| 2002/0163153 A1 | 11/2002 | Conrad | |
| 2004/0084822 A1 | 5/2004 | Collyer et al. | |
| 2004/0113337 A1 * | 6/2004 | Landry, Jr. | F16F 1/3873 267/141 |
| 2010/0201086 A1 * | 8/2010 | Sagara | B60G 3/20 280/5.522 |
| 2014/0097588 A1 * | 4/2014 | Del Pup | B60G 7/001 280/124.116 |

FOREIGN PATENT DOCUMENTS

| | | | |
|---|---|---|---|
| GB | 783221 A | | 8/1957 |
| JP | 2001271882 A | * | 10/2001 |
| JP | 2008039134 A | | 2/2008 |
| WO | 2017142633 A1 | | 8/2017 |

* cited by examiner

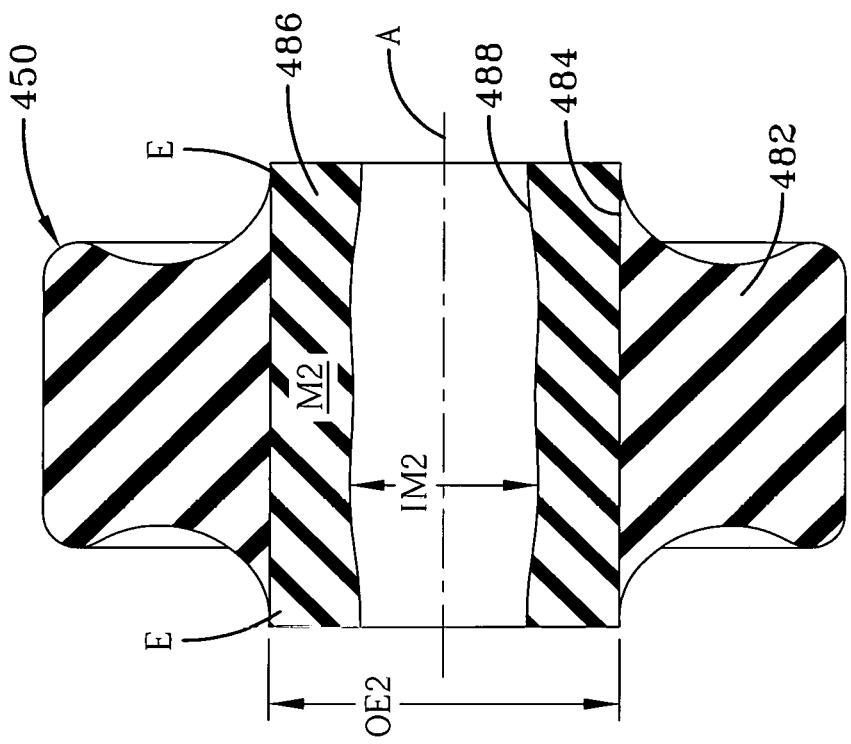
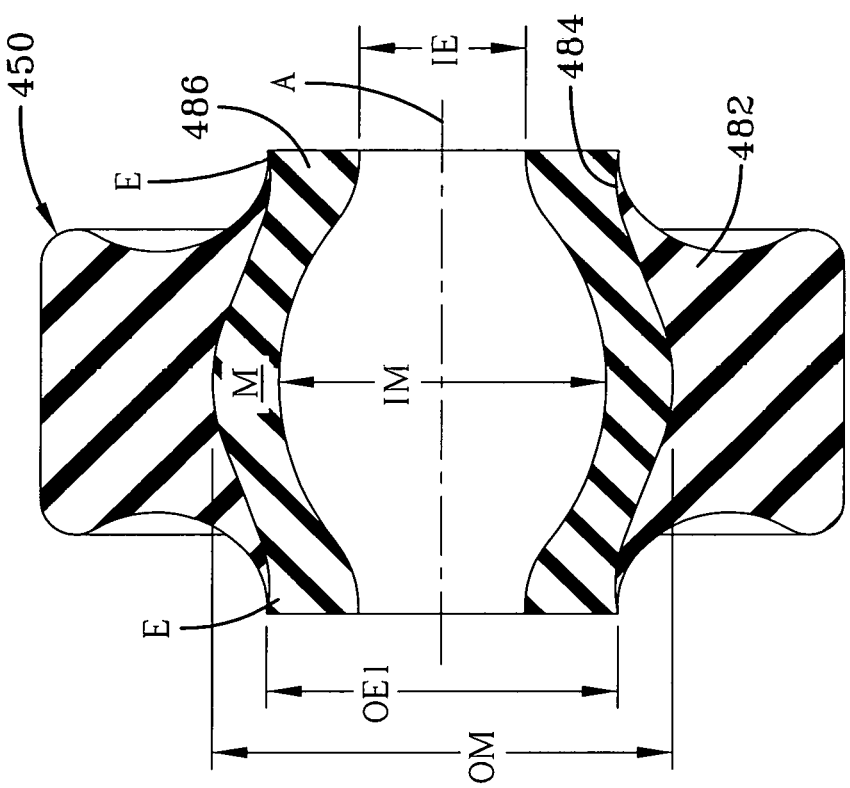

MULTI-FUNCTIONAL SUSPENSION BUSHING

CROSS-REFERENCE TO RELATED APPLICATIONS

This application claims the benefit of U.S. Provisional Patent Application Ser. No. 62/546,161 filed on Aug. 16, 2017.

TECHNICAL FIELD

The subject matter relates generally to an air-ride axle/suspension system for a heavy-duty vehicle that has a hanger supporting a beam for limited pivotal movement. In particular, the subject matter relates to a bushing assembly for mounting the beam to the hanger and a bushing structure.

BACKGROUND

Beam-type axle/suspension systems have been used in heavy-duty vehicles such as trucks and tractor-trailers for many years. The heavy-duty vehicle may include more than one beam-type axle/suspension system. Each beam-type axle/suspension system includes a pair of suspension assemblies per axle. The suspension assemblies may be connected with a frame or subframe of the heavy-duty vehicle.

Each suspension assembly of the axle/suspension system includes a hanger that is attached to, and depends from, the frame of the heavy-duty vehicle. Each suspension assembly also includes a longitudinally extending elongated beam. The beam is pivotally mounted at one end portion to the respective hanger. A transversely extending axle has a portion that is attached to the beam at a location spaced from the pivotal end portion of the beam. An end portion of the beam opposite the pivotally mounted end portion is attached to an air spring which is also attached to the frame.

The axle/suspension system provides ride, handling and damping characteristics to the heavy-duty vehicle. More particularly, as the heavy-duty vehicle is traveling over a road, its tires and wheels encounter road conditions that impart various forces, loads, and/or stresses, collectively referred to as "forces", to the respective axle on which the tires and wheels are mounted. In turn, the forces are transferred to the suspension assemblies that connect with the axle. In order to minimize the detrimental effect of these forces on the heavy-duty vehicle as it is operating, the axle/suspension system is designed to react and to minimize or absorb at least a portion of the forces.

The forces include forces along the vertical direction caused by vertical movement of the tires and wheels as they encounter certain road conditions. The forces also include forces along the horizontal direction due to fore-aft or horizontal movement from acceleration, deceleration and braking of the heavy-duty vehicle. The forces further include lateral and torsional forces associated with transverse vehicle movement, such as turning of the vehicle and lane-change maneuvers. In order to address such various forces, axle/suspension systems have differing design and structural requirements.

For example, it is desirable for an axle/suspension system to be fairly stiff in order to minimize the amount of sway experienced by the heavy-duty vehicle and provide roll stability from lateral forces. It is also desirable for the axle/suspension system to be relatively less stiff or flexible to assist in cushioning the heavy-duty vehicle from vertical forces, while providing compliance so that components of the axle/suspension system are able to withstand the vertical forces. It is further desirable to dampen the vibrations or oscillations that result during operation of the heavy-duty vehicle. A key component of the axle/suspension system that cushions the ride of the heavy-duty vehicle from vertical impacts is the air spring, while a shock absorber typically provides damping characteristics to the axle/suspension system. It is known that air springs may also be designed and constructed to provide damping characteristics.

It is desirable to limit the downward movement of the beams and axle to minimize the possibility of damage to the air spring and/or to other components of the axle/suspension system under certain conditions. For example, when a trailer is lifted onto a railroad car, the beams and axle pivot downwardly. Another example is when the trailer is being backed up and brakes of the heavy-duty vehicle are actuated and cause the axle/suspension system to extend downwardly, called "reverse braking" or, if so equipped, when a slider is repositioned. Also, during operation of the heavy-duty vehicle, the beams and axle may suddenly drop, or move downwardly, as a result of a pothole, or other road hazard. If the downward pivotal movement of the beams and axle is not limited to a predetermined amount, damage to the air spring and/or to other components of the axle/suspension system could result. That is, unabated downward pivotal movement of the beams and axle may overextend the air spring. Limiting downward movement of the beams and axle minimizes the possibility of potential damage to the air spring and/or to other components of the axle/suspension system.

In some heavy-duty vehicles, a chain or pair of chains or shock absorbers are used to limit downward movement of the beams and axle. The chains act as a positive mechanical limiting structure or down-stop. Limiting the downward movement of the beams and axle with the known chains minimizes the possibility of potential damage to the air spring and/or to other components of the axle/suspension system. The chains or other similar mechanical travel limiting devices such as straps, cables, wire ropes and the like, operate in tension and may be exposed to road splash and debris that could damage the mechanical travel limiting devices if not designed to endure those relatively harsh environments. In order to withstand the weight of, and forces acting on, the beams and axle, the links of the chain must be relatively robust which undesirably adds to the overall weight and cost of the heavy-duty vehicle.

The prior art axle/suspension system uses a robust pivot bushing at the pivot connection of a beam to a hanger for the satisfactory management of static loads, roll moments and braking forces that the bushing experiences. The known pivot bushing has specific and differing stiffnesses or resistances to deformation in the vertical and horizontal directions in which forces are applied. The known pivot bushing is designed and constructed to react to vertical, horizontal and lateral forces that are typically encountered during normal operation of the heavy-duty vehicle.

A new and improved positive mechanical down-stop for limiting downward movement of beams and an axle of an axle/suspension system has been developed. The new and improved positive mechanical down-stop limits downward pivotal movement of the beam and axle and creates a force in a direction that the prior art bushing designs did not consider. The new and improved positive mechanical down-stop for the axle/suspension system incorporates a new and improved bushing of the present subject matter.

The axle/suspension system includes a pair of suspension assemblies, each of which is supported by a hanger depending from a frame member of the heavy-duty vehicle. Each suspension assembly includes a beam mounted to the hanger for pivotal movement at a pivot connection. A bumper is fixed to a portion of the beam. The bumper contacts structure to positively limit downward pivotal movement of the beam. A force is created at the pivot connection in a force application direction that is angularly spaced from horizontal and vertical directions.

The pivot connection includes a bushing with an elastomeric bushing body. The elastomeric bushing body has relatively low stiffness or resistance to compressive forces or deformation in a region that is located in a substantially vertical direction. The relatively low stiffness region is located in the elastomeric bushing body angularly spaced from the down-stop force application direction. The bushing has a relatively greater stiffness along the force application direction.

Thus, a need exists for an improved bushing structure for use with a new positive mechanical down-stop of an air spring axle/suspension system to limit downward pivotal movement of the beams and axle. The improved bushing must accommodate the application of non-vertical and non-horizontal forces created by the use of the new positive mechanical down-stop having components under compressive forces to limit downward pivotal movement of the beams and axle.

SUMMARY

This summary is provided to introduce concepts that are described. This summary is not intended to identify key factors or essential features of the claimed subject matter, nor is it intended to be used to limit the scope of the claimed subject matter.

An improved bushing of the present subject matter enables and compliments the deployment of a new positive mechanical down-stop structure. The new positive mechanical down-stop limits the downward pivotal movement of beams and axle. The new positive mechanical down-stop has less components, is relatively simple, is less costly to manufacture, requires less assembly time and is lighter in weight than previously known robust chain down-stops or other known mechanical travel limiting devices to yield a lighter overall weight of the heavy-duty vehicle. The improved bushing of the present subject matter for use with the new positive mechanical down-stop satisfies the need to accommodate the application of non-vertical and non-horizontal forces.

By way of example, an improved axle/suspension system for a heavy-duty vehicle is employed. The axle/suspension system may be used in a slider type of axle/suspension system or mounted directly to a frame of the heavy-duty vehicle, such as a primary frame or a subframe. The improved axle/suspension system is supported by hangers depending from a frame member of the heavy-duty vehicle. The axle/suspension system may include a plurality of suspension assemblies.

Each suspension assembly is supported by a hanger connected to a frame member of the heavy-duty vehicle. A beam is mounted at a pivot connection to the hanger for pivotal movement about an axis of rotation. A bumper is fixed to the beam and contacts structure of the frame or hanger to limit downward pivotal movement of the beam and axle in one direction. When the bumper is engaged with the structure of the frame or hanger, a reaction force is applied to the pivot connection in a force application direction that is angularly spaced from horizontal and vertical and that extends through the axis of rotation. The pivot connection includes a bushing having an elastomeric bushing body. The elastomeric bushing body may have a cavity or void that extends at least partially through the bushing body and substantially parallel to the axis of rotation to decrease stiffness and/or resistance to deformation of the bushing body in a substantially vertical direction. The entire cavity or void in the bushing body is angularly spaced from the force application direction. The bushing body is substantially solid along the force application direction.

The cavity or void may extend completely through the bushing body. The bushing body may include two cavities or voids extending at least partially through the bushing body and substantially parallel to the axis of rotation. At least one of the two cavities or voids may extend completely through the bushing body. A circumferential midpoint of each of the cavities or voids may be spaced in opposite directions from the force application direction in the range from about 70° to about 140°. At least one of the cavities or voids may have a portion intersected by the vertical plane. The force application direction may extend from horizontal at an angle in a range from about 10° to about 20°.

The bushing may include an elongated tubular metal sleeve having a substantially constant cross-section. The bushing may include an elongated tubular sleeve with variable outer dimensions disposed within the bushing body. The sleeve has a first intermediate portion with a first outer dimension. The first intermediate portion is located between opposite end portions of the sleeve. Each of the end portions of the sleeve has a second outer dimension. The first outer dimension is greater than the second outer dimension. The first intermediate portion is oriented in the force application direction.

The sleeve may have a second intermediate portion located between the opposite end portions. The second intermediate portion has an outer dimension substantially equal to the second outer dimension of the opposite end portions. The second intermediate portion is circumferentially offset from the first intermediate portion and oriented in the vertical direction.

DRAWINGS

The following description and drawings set forth certain illustrative aspects and implementations of the present subject matter. These are indicative of but a few of the various ways in which one or more aspects and implementations may be employed. Further features of the present subject matter will become apparent to those skilled in the art to which the present subject matter relates from reading the following description with reference to the accompanying drawings, in which:

FIG. 22 is a cross-sectional view of a portion of the bushing illustrated in FIG. 21 and viewed approximately along the plane indicated by line 22-22 of FIG. 21; and FIG. 23 is a cross-sectional view of another portion of the bushing illustrated in FIG. 21 and viewed approximately along the plane indicated by line 23-23 of FIG. 21.

DESCRIPTION

Figure 1:
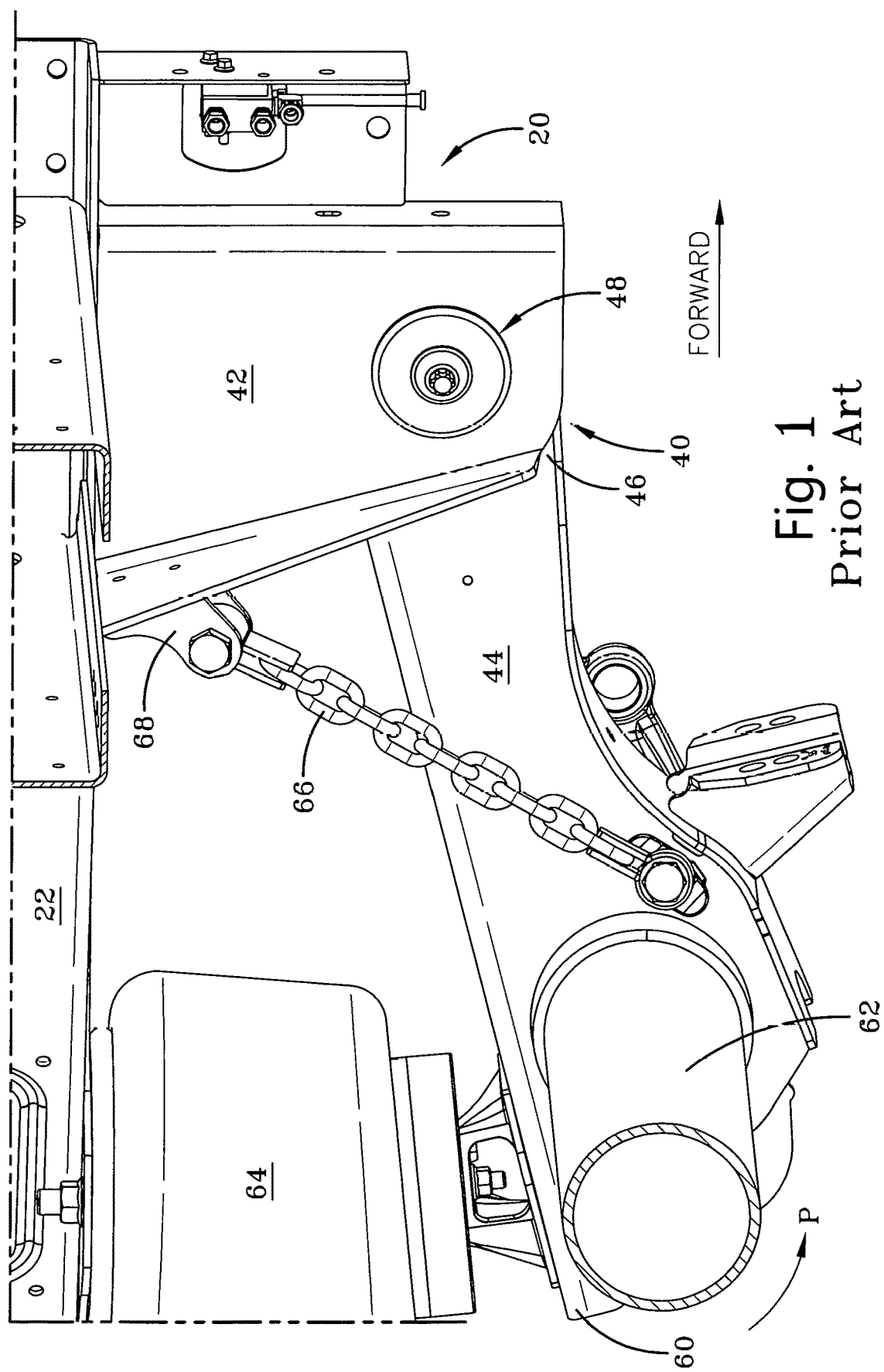
FIG. 1 is a fragmentary side elevation view of a portion of a prior art axle/suspension system.
Figure 2:
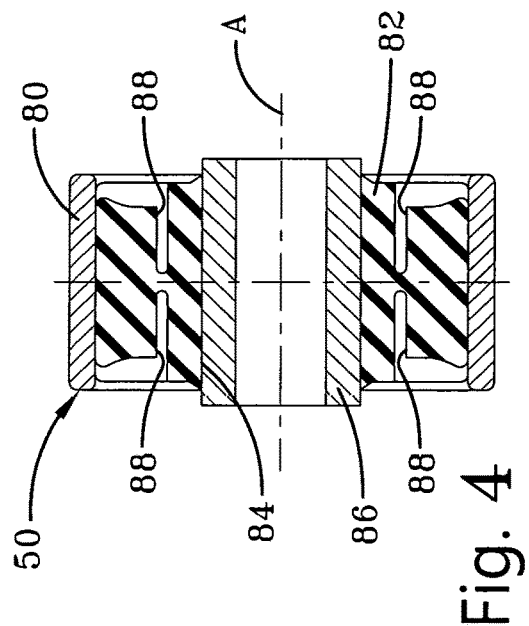
FIG. 2 is a perspective view of a prior art bushing used in the prior art axle/suspension system illustrated in FIG. 1.
Figure 4:
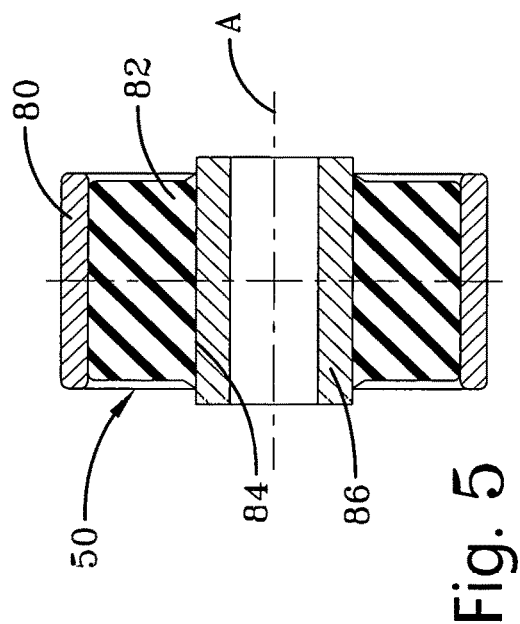
FIG. 4 is a cross-sectional view of the prior art bushing taken approximately along the plane indicated by line 4-4 in FIG. 3.
Figure 3:
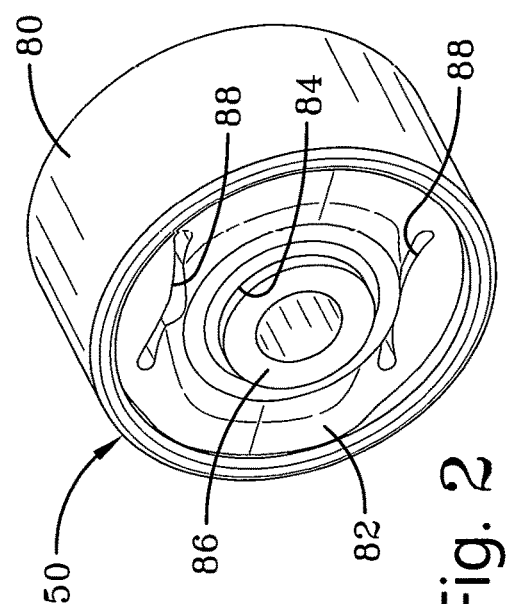
FIG. 3 is a side elevation view of the prior art bushing illustrated in FIG. 2.
Figure 5:
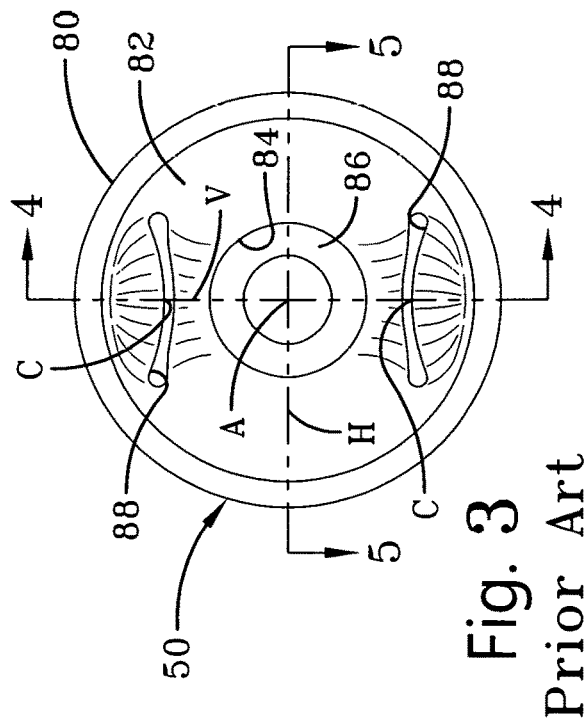
FIG. 5 is a cross-sectional view of the bushing taken approximately along the plane indicated by line 5-5 in FIG. 3.

The present subject matter is described with reference to the drawings, in which like reference characters are used to refer to like components and orientations throughout the description. For exemplary purposes, numerous specific details are set forth in order to provide an understanding of the present subject matter. It will be understood, however, that the present subject matter may be practiced without these specific details. It will also be understood that these specific details are not to be construed as limiting.

An axle/suspension system for a heavy-duty vehicle was developed incorporating the new and improved positive mechanical down-stop for limiting downward movement of beams and axle that uses the new and improved bushing of the present subject matter. The axle/suspension system includes a pair of suspension assemblies, each of which is supported by a hanger depending from a frame or frame member of the heavy-duty vehicle. Each suspension assembly includes a beam mounted to the hanger for pivotal movement at a pivot connection. A bumper is fixed to a portion of the beam. The bumper contacts structure associated with the hanger or frame member to positively limit downward pivotal movement of the beam. A force is applied to the pivot connection in a force application direction that is angularly spaced from horizontal and vertical directions and may be through a longitudinal central axis of the pivot connection. The pivot connection includes a bushing with an elastomeric bushing body. The elastomeric bushing body may have a cavity or void that extends at least partially through the bushing body and substantially parallel to the longitudinal central axis of the pivot connection. The cavity or void in the elastomeric bushing body decreases stiffness and/or rigidity in a substantially vertical direction. The cavity or void is located in the elastomeric body so it is angularly spaced from the force application direction and in the vertical direction. The bushing is substantially solid along the force application direction.

The new and improved bushing is intended for use with a new positive mechanical down-stop in an axle/suspension system for a heavy-duty vehicle. The new and improved bushing accommodates the reaction to non-vertical and non-horizontal forces that the new positive mechanical down-stop generates at the bushing in a force application direction. The new and improved bushing has sufficient stiffness or resistance to deformation in the force application and/or horizontal directions and elastic compliance in the vertical or horizontal direction. The new and improved bushing is constructed to provide multi-functional characteristics while providing satisfactory performance characteristics during operation of the heavy-duty vehicle.

In order to better understand the environment in which the bushing of the present subject matter is utilized, a prior art trailing arm beam-type air-ride axle/suspension system 20 is described and shown in FIG. 1, by way of example. It will be appreciated that the beam may extend rearward or forward from a connection about which it pivots relative to the front of the heavy-duty vehicle. The orientation of these beams defines what are typically referred to as trailing arm or leading arm axle/suspension systems, respectively. However, for exemplary purposes of this description, the term "trailing arm" will be used and applies equally to beams which extend either rearward or forward with respect to the front of the heavy-duty vehicle.

The axle/suspension system 20 is typically mounted to a pair of parallel and longitudinally-extending spaced-apart frame or frame members 22 of a heavy-duty vehicle (not shown). The frame or frame members 22 are representative of various types of frames, components or configurations used for heavy-duty vehicles. The frame or frame members 22 could include primary frames, subframes and/or cross members. Because the axle/suspension system 20 generally includes a substantially identical pair of mirror imaged and laterally or transversely spaced suspension assemblies 40 per axle, only one of the suspension assemblies will be shown and described, for clarity and brevity.

Each suspension assembly 40 includes a hanger 42 connected to and depending from the frame member 22. The suspension assembly 40 also includes a trailing arm beam 44 that is pivotally connected to the hanger 42 at a pivot location. The trailing arm beam 44 is formed into an inverted general U-shape with a pair of laterally spaced sidewalls and a top connecting the uppermost ends of the sidewalls. An open portion of the trailing arm beam 44 typically faces downward, or in a direction away from the frame member 22 of the heavy-duty vehicle. The trailing arm beam 44 may include a bottom plate extending between and connecting the lowermost end portions of the sidewalls.

The trailing arm beam 44 includes a front end portion 46 with a bushing assembly 48. The bushing assembly 48 typically includes a bushing 50 (FIGS. 2-5), pivot bolt, sleeves, wear pads and washers as is known. The bushing assembly 48 pivotally connects the front end portion 46 of the trailing arm beam 44 to the hanger 42. The trailing arm beam 44 also includes a rear end portion 60. A transversely extending axle 62 is received and supported by the trailing arm beam 44 and is fixed to the trailing arm beam by suitable means, such as welding.

The axle/suspension assembly 40 also includes an air spring 64 that is typically mounted on the rear end portion 60 of trailing arm beam 44 and extends between the trailing arm beam and the frame 22. The axle/suspension system 20 may be supplied with shock absorbers (not shown) to provide damping. A brake system (not shown) of the heavy-duty vehicle is typically mounted on an end portion of the axle 62.

Downward pivotal movement P (counter-clockwise as viewed in FIG. 1) of the rear end portion 60 of the trailing arm beam 44 may occur in certain situations during operation of the heavy-duty vehicle. The downward pivotal movement may occur in the certain situations, such as when the axle/suspension system suddenly drops as a result of a pothole, or other road hazard during operation of the heavy-duty vehicle, during "reverse braking", repositioning of a slider or when the heavy-duty vehicle, such as a trailer, is being lifted onto a railroad car. The rear end portion 60 of the trailing arm beam 44 may pivot downwardly an amount that could possibly overextend and damage the air springs 64 and/or other components of the axle/suspension system 20 if pivotal downward movement of the beams and axle is not limited. A chain down-stop 66 is employed to limit or prevent downward pivotal movement of the rear end portions 60 of the trailing arm beam 44 to a predetermined amount. Limited pivotal downward movement avoids potential damage to the air springs 64 and/or other components of the axle/suspension system 20.

A bottom or lower, as viewed in FIG. 1, end portion of the chain down-stop 66 attaches at a suitable location to the trailing arm beam 44 by fastening means, such as a bolt. A top or upper end portion of the chain down-stop 66 is connected to a mounting bracket 68 by suitable means, such as a bolt. The mounting bracket 68 is fixed to a member of the frame 22 of the heavy-duty vehicle or the hanger 42 of the suspension assembly 40 by welding or other suitable means. The chain down-stop 66 includes a plurality of links that collectively act in tension to limit the downward pivotal movement of the trailing arm beam 44 to the predetermined amount. The length of the chain down-stop 66 establishes the maximum amount of downward pivotal movement that trailing arm beam 44 may traverse. Preferably, the chain down-stop 66 reaches its extensible limit in tension before the air spring 64 reaches an extent that may cause damage to the air spring. It is understood that devices other than chains have been utilized in previously known suspension systems, such as straps, cables, wire ropes and the like, that all act in tension to limit downward travel of a beam in an axle/suspension system. It should also be understood that the end portions of the chain down-stop 68 may be attached to other suitable components of the heavy-duty vehicle.

The bushing 50 (FIGS. 2-5) includes a beam mounting sleeve 80 which typically is fixed to the front end portion 46 of the trailing arm beam 44. The beam mounting sleeve 80 is typically made of a suitable metal material, such as steel. An elastomeric bushing body 82 is press-fit into the beam mounting sleeve 80. The bushing body 82 is elastic and generally cylindrical-shaped. The bushing body 82 is formed with a central opening 84 that passes completely through the bushing body about a longitudinal central axis A about which the trailing arm beam 44 pivots. A pair of circumferentially spaced-apart cavities or voids 88 is formed in each side of the bushing body 82, as viewed in FIG. 4. Each of the cavities or voids 88 is formed in respective top and bottom portions on each side of the bushing body 82. The cavities or voids 88 have respective arcuate mid-points C, as viewed in FIG. 3, spaced 180° apart and located substantially along a vertical axis V, as it would be oriented when the bushing 50 is mounted in a heavy-duty vehicle. The cavities or voids 88 do not necessarily extend completely axially through the bushing body 82. The cavities or voids 88 enable the prior art bushing assembly 48 to provide functional characteristics and to react differently to forces in the vertical V and horizontal H directions, as well as reaction to sway or roll forces encountered during vehicle operation.

A rigid metal sleeve 86 is positioned within the opening 84 of the bushing body 82 and retained in the bushing body by any suitable method, such as with an adhesive or by mold-bonding. The combined structure of the bushing body 82 and metal sleeve 86 is press fit into the beam mounting sleeve 80. The metal sleeve 86 has a circular tube cross-section taken perpendicular to the longitudinal central axis A. The metal sleeve 86 is made of any suitably strong metal, such as steel. The metal sleeve 86 mounts the bushing assembly 48 to the hanger 42 by a bolt (not shown) passing through the metal sleeve, a pair of suitable plastic spacer pads (not shown) and washers (not shown) and a fastening nut (not shown), as is known. Each one of the pair of spacer pads is loosely disposed over a respective one of the ends of the metal sleeve 86. The spacer pads protect sidewalls of hanger 42 from contact with ends of the beam mounting sleeve 80.

The bushing assembly 48 provides desired vertical load-deflection, horizontal load-deflection and reaction to roll or sway forces. The bushing assembly 48 is relatively stiffer or resistant to deformation in the horizontal direction H (FIG. 3) than in the vertical direction V. The functional characteristics of bushing 50 of the bushing assembly 48 provide desired load deflection or absorption of varying levels in the vertical direction, horizontal direction and reaction to roll or sway forces. The bushing 50 of the bushing assembly 48 is relatively stiff in the horizontal direction H due to the bushing body 82 being substantially solid in a direction along the horizontal radial direction. Thus, the bushing 50 accommodates or absorbs horizontal loading which may be placed on the axle/suspension system, such as during braking. The bushing 50 of the bushing assembly 48 is also relatively soft or more compliant in the vertical direction V due to the placement and size of the voids 88 in the bushing body 82. This enables the axle/suspension system 20 to absorb vertical loading shocks, such as from a bump or pothole in the road and provide proper roll-stability for the heavy-duty vehicle.

Bushing assemblies 48 have been successfully used in prior art heavy-duty vehicle applications for their intended use with prior art mechanical down-stops, such as chains, shock absorbers, straps, cables, wire ropes and the like, that act in tension to limit travel of the trailing arm beam 44. The relative directional stiffnesses of the bushing body 82 provides only for accommodation of forces applied substantially in the vertical direction V and the horizontal direction H. Thus, a need exists for an improved bushing for use with a new type of positive mechanical down-stop and the unique directions of force application to which the bushing will be subjected.

According to an aspect of the present subject matter and by way of example, a new and improved bushing is provided. The new and improved bushing is intended for use on a heavy-duty vehicle. The new and improved bushing enables the deployment of the new positive mechanical down-stop while providing satisfactory performance characteristics when exposed to unique directions of force application to which the bushing will be subjected during operation of the heavy-duty vehicle. Heavy-duty vehicles include trucks, tractor-trailers, trailers, buses, and the like which typically have relatively large gross vehicle weights. For the purpose of convenience and brevity, reference will be made to a "heavy-duty vehicle", with the understanding that such reference is by way of example and equally applies to trucks, tractor-trailers, trailers, buses, and the like.

The bushing includes an elastomeric bushing body with at least one void extending at least partially axially to decrease stiffness or resistance to deformation in a substantially vertical direction. The new type of positive mechanical down-stop applies a new force to the bushing of the pivot connection, not previously encountered, in a force application direction. The force application direction is angularly spaced from horizontal and vertical planes of approximately 15° upward or counter-clockwise from the horizontal plane. The void is located circumferentially in the elastomeric body angularly spaced from the force application direction. The bushing is substantially solid along the force application direction and, therefore, has the greatest stiffness of the bushing resisting the application of this new force with a configuration providing sufficient fatigue resistance.

Figure 6:
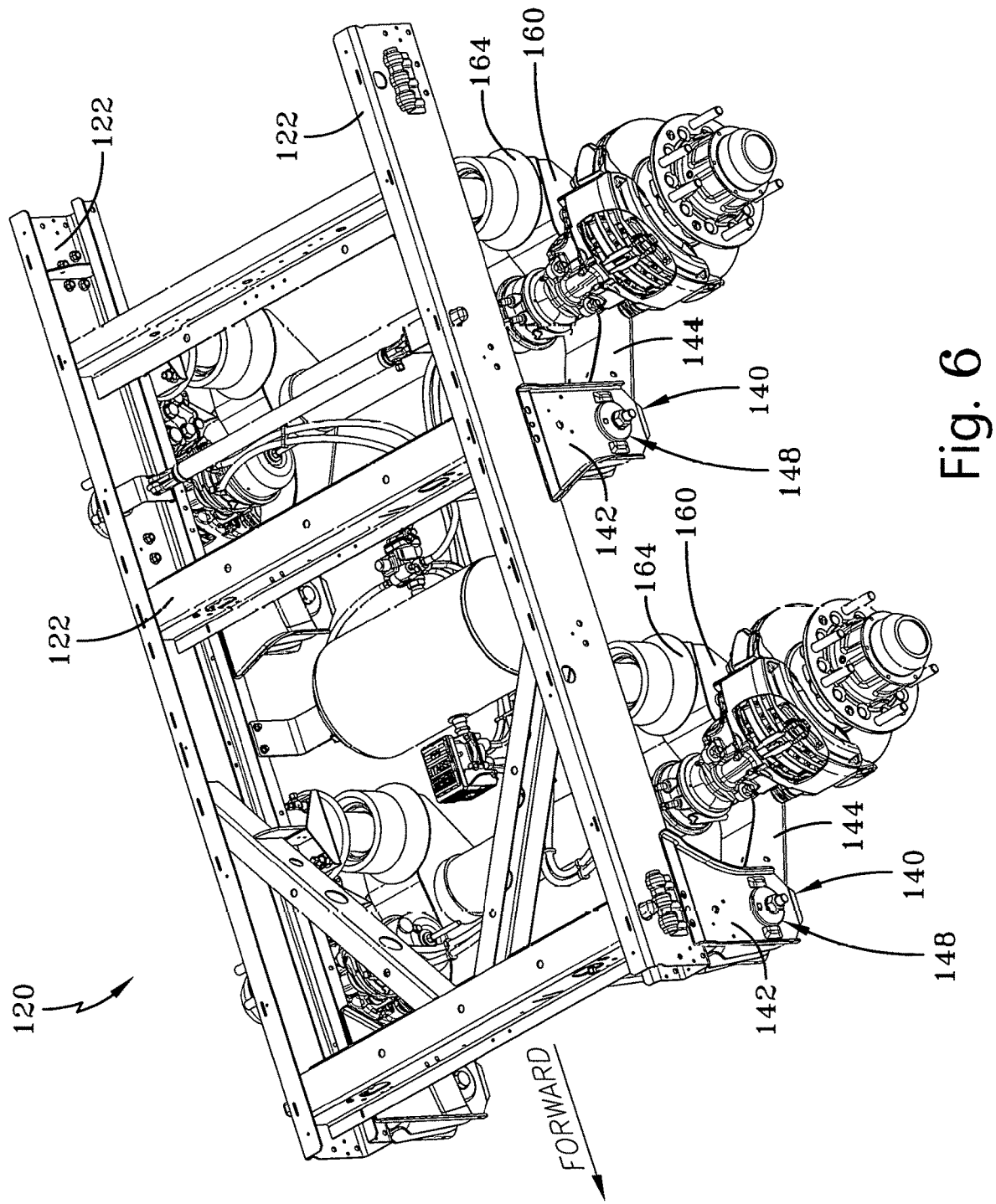
FIG. 6 is an overall perspective view of an exemplary slider type of axle/suspension system for a heavy-duty vehicle, incorporating a new positive down-stop mechanism and a bushing according to an aspect of the present subject matter.

The new and improved bushing, constructed according to one aspect, is used in an air-ride axle/suspension system 120 (FIG. 6), one or more of which may be utilized in a slider box of a heavy-duty vehicle (not shown). The axle/suspension system 120 is typically mounted to and supported by various known longitudinally-extending and/or transversely-extending spaced-apart frame members 122 of the heavy-duty vehicle. The frame members 122 are representative of various types of frames used for heavy-duty vehicles and could include primary frames, subframes and cross members. The subframe could be of a non-movable or movable type, such as the slider box illustrated in FIG. 6. All of the various types of frames and components of frames will be referred to as a "frame" or "frame member" throughout.

Each axle/suspension system 120 includes a pair of substantially identical suspension assemblies 140. Any suitable number of axle/suspension systems 120 may be utilized. For the sake of clarity and brevity only one axle/suspension system 120 and only one suspension assembly 140 will be described. It is understood that the description of one axle/suspension system 120 and one suspension assembly 140 will equally apply to all of the axle/suspension systems and suspension assemblies.

While a trailing arm beam axle/suspension system 120 is shown by way of example, it will be appreciated that the beam may extend rearward or forward from a pivotal connection relative to the front of the heavy-duty vehicle. These are typically referred to as trailing arm or leading arm axle/suspension systems, respectively. However, for exemplary purposes of the description, the term "trailing arm" will apply equally to beams which extend either rearward or forward with respect to the front end or direction of forward movement of the heavy-duty vehicle.

Each suspension assembly 140 includes a hanger 142 made up of two hanger side portions (only one hanger side portion is shown for clarity and exemplary purposes in FIGS. 6-10) fixed to the frame 122. Each hanger 142 may be formed from a suitably thick and strong metal material, such as steel. The suspension assembly 140 also includes a trailing arm beam 144 that is mounted to the hanger 142 for relative pivotal movement about an axis A (FIG. 10) of rotation. The trailing arm beam 144 is formed from any suitable manufacturing method and material, such as bent or welded plate steel, having a general U-shape cross-section with a pair of laterally spaced sidewalls and a connecting portion. An open portion of the trailing arm beam 144 may be closed by a welded plate.

The trailing arm beam 144 further includes a front or first end portion 146 (FIGS. 7-10) and a rear or second end portion 160. A bushing assembly 148 connects the trailing arm beam 144 to the hanger 142 for pivotal movement. The bushing assembly 148 includes a bushing 150 (FIGS. 8 and 10), a bolt (not shown), a nut (not shown) and washers (not shown) as is known, to accommodate relative pivotal connection of the trailing arm beam 144 with the hanger 142 about the axis A of rotation.

The trailing arm beam 144 supports a respective end portion of a transversely extending axle 162 (FIGS. 7 and 9) at the rear or second end portion 160 of the trailing arm beam. The end portion of the axle 162 is fixed to the trailing arm beam 144 by suitable means, such as welding or fastening. The suspension assembly 140 may include an air spring 164 that is mounted to and extends between the rear or second end portion 160 of the trailing arm beam 144 and the frame member 122. The air spring 164 establishes a relative position between the trailing arm beam 144 and the frame member 122 of the heavy-duty vehicle as a function of air pressure within the air spring, as is known. The suspension assembly 140 and axle/suspension system 120 may be supplied with shock absorbers (not shown) to provide damping. The air spring 164 may optionally be designed and constructed to provide all damping characteristics, eliminating the need for shock absorbers. The air spring 164 may also be designed and constructed to provide some of the needed damping characteristics and work in conjunction with a shock absorber to provide damping.

A new mechanical down-stop 180 includes a bumper 182, an extension portion 184 and an engagement member 186. The bumper 182 is fixed to the extension portion 184 of the trailing arm beam 144 that is located on a second side of the bushing assembly 148 opposite the front or first end portion 146 of the trailing arm beam. The extension portion 184 of the trailing arm beam 144 may be a separate component that is permanently attached to the trailing arm beam by suitable means, such as welding. The extension portion 184 of the trailing arm beam 144 may be integrally formed as one piece with the trailing arm beam.

Figure 7:
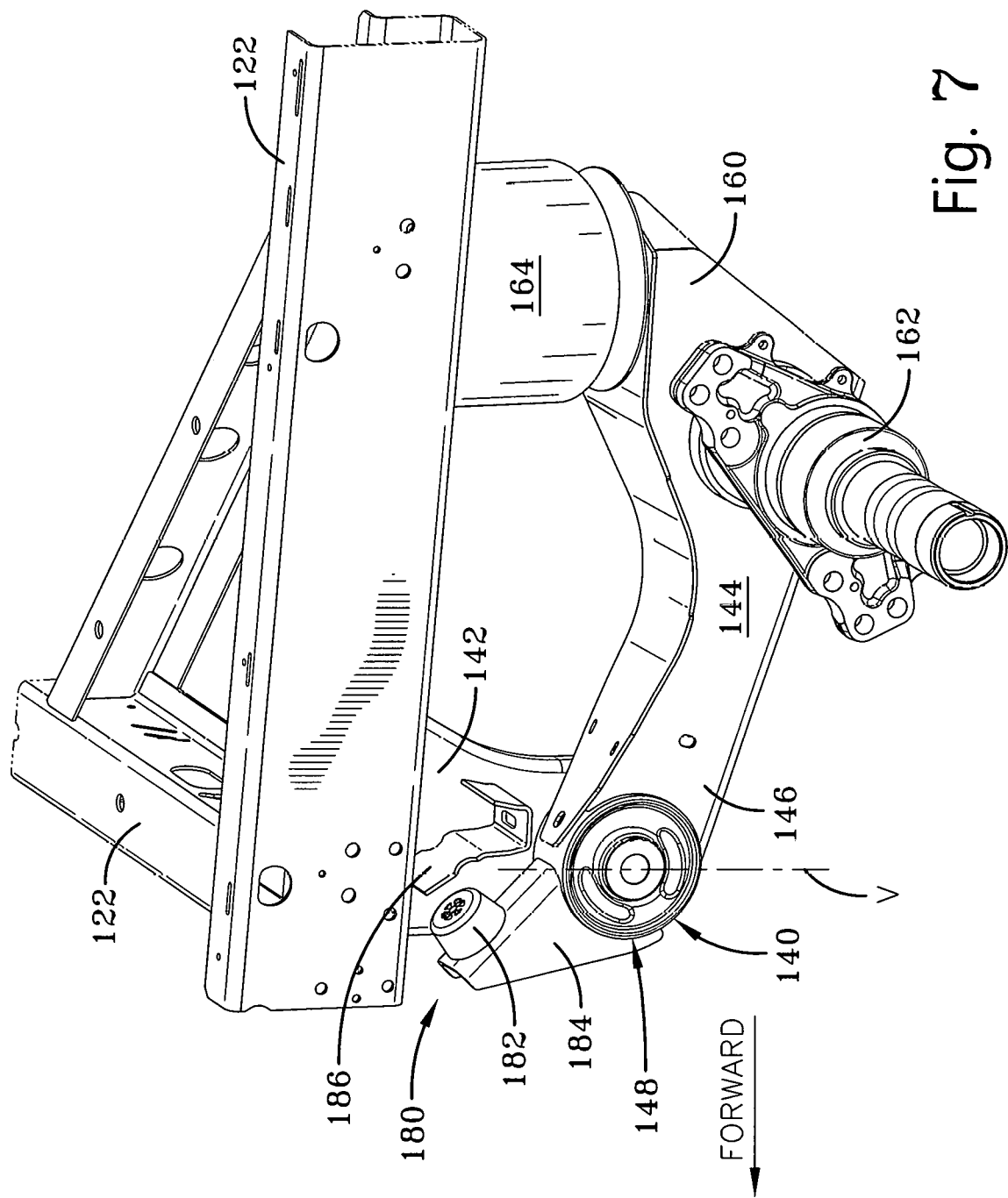
FIG. 7 is a fragmentary perspective view of a portion of the axle/suspension system illustrated in FIG. 6 with components in one relative position.
Figure 8:
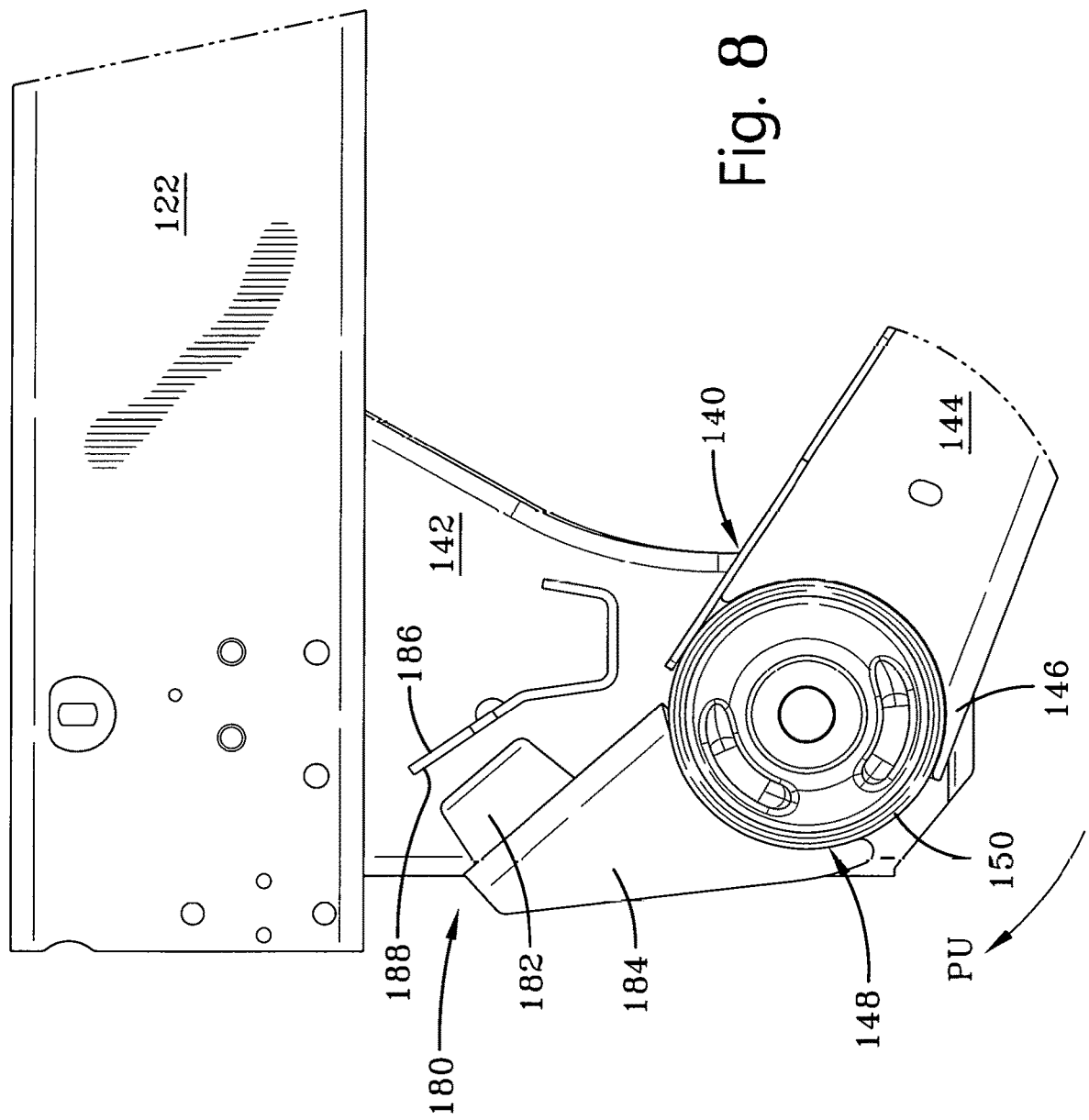
FIG. 8 is an enlarged fragmentary side elevation view of the portion of the axle/suspension system illustrated in FIG. 7 with the components in the one relative position.
Figure 9:
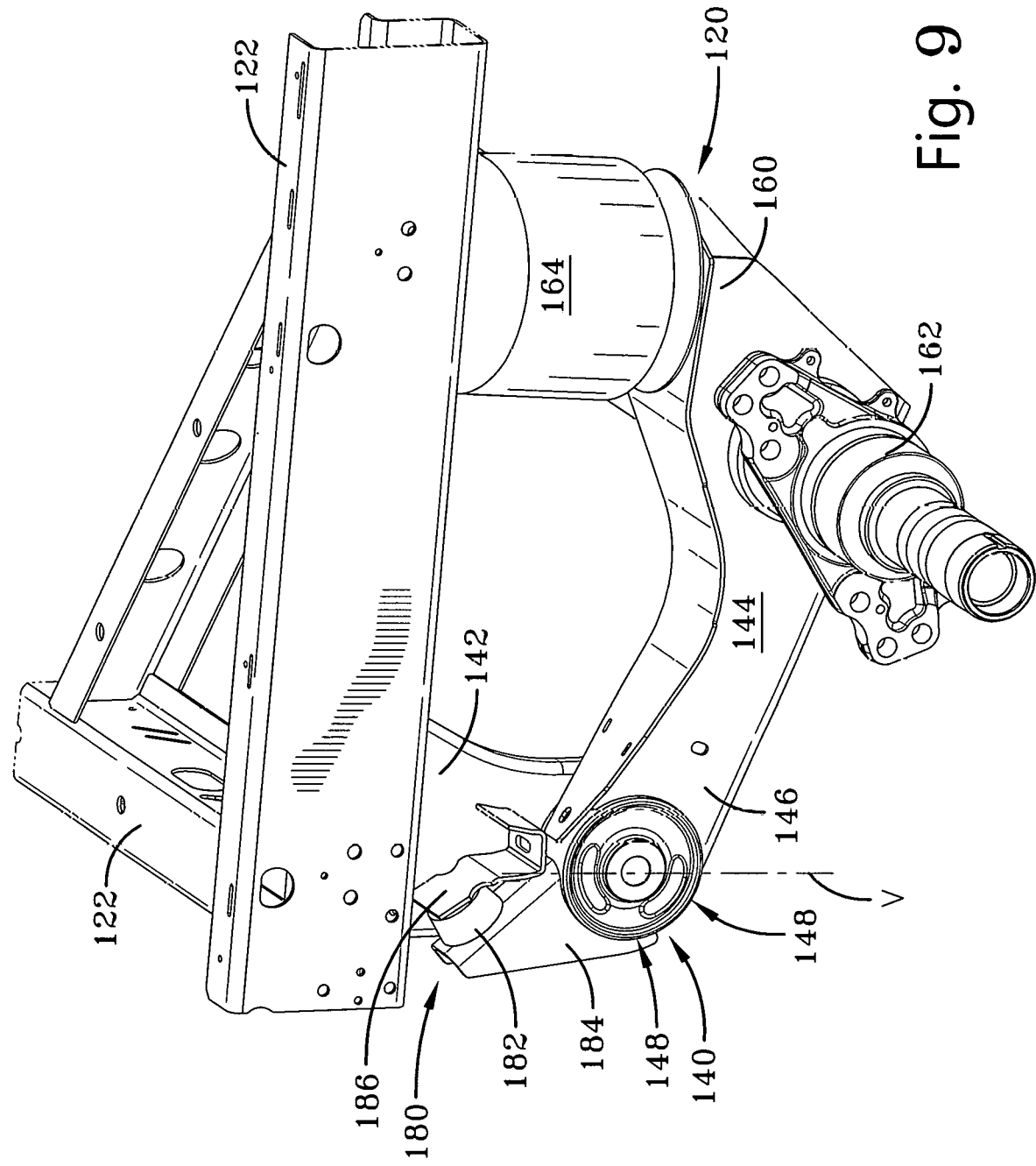
FIG. 9 is an enlarged fragmentary perspective view similar to FIG. 7, of the portion of the axle/suspension system with components in another relative position.
Figure 10:
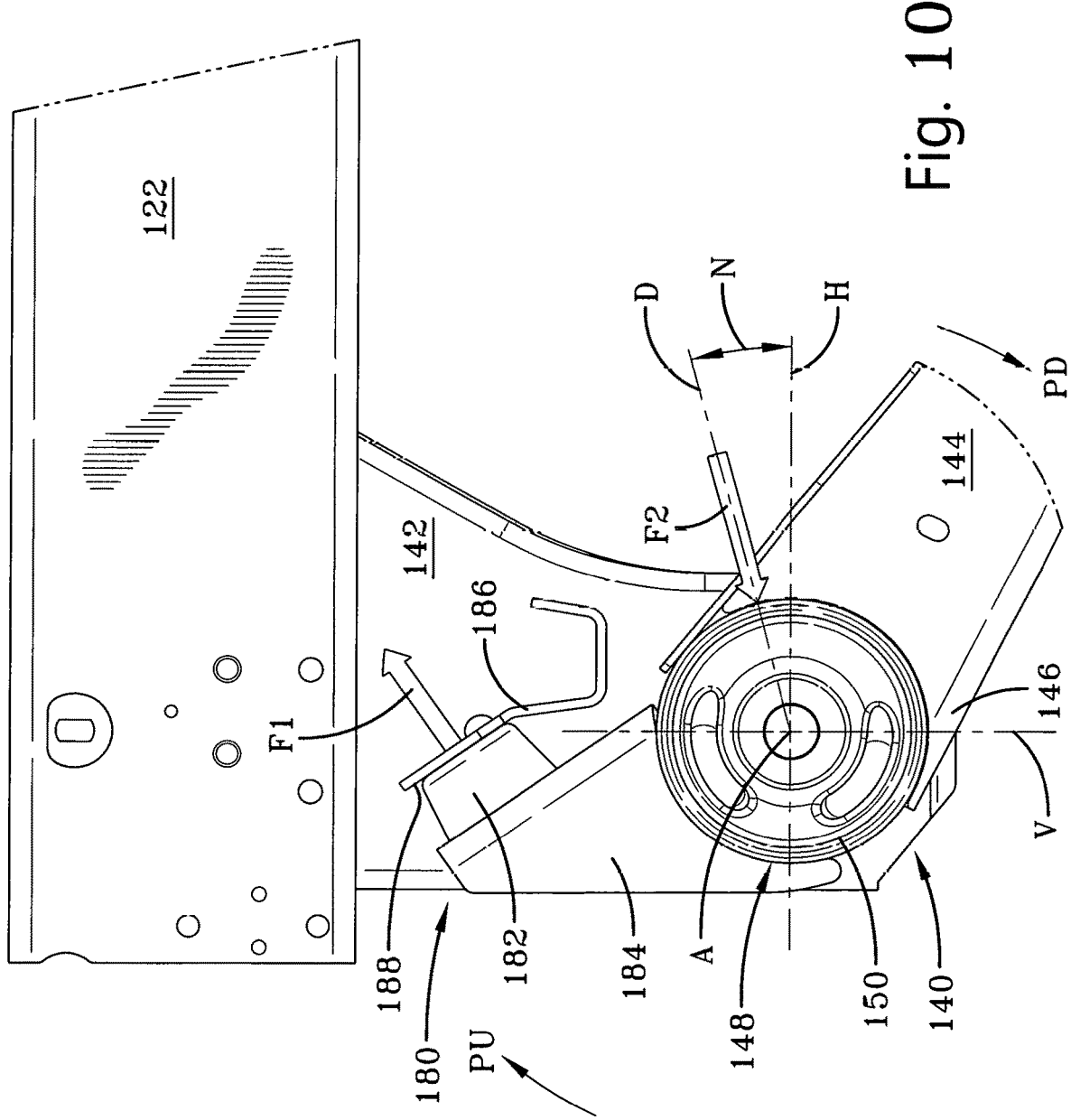
FIG. 10 is a fragmentary side elevation view similar to FIG. 8, of the portion of the axle/suspension system illustrated in FIG. 9 with the components in the other relative position.

The bumper 182 is normally spaced from contact with any component of the frame members 122 or hanger 142 of the heavy-duty vehicle, such as engagement member 186, when the trailing arm beam 144 and axle 162 are at a neutral ride height, as illustrated in FIGS. 7-8. The extension portion 184 pivots upward or clockwise about the axis A of the bushing assembly 148 in the direction PU and the bumper 182 contacts and engages a surface 188 (FIG. 8) of the engagement member 186 that is associated with at least one of the frame member 122 and hanger 142, as illustrated in FIGS. 9-10. The engagement member 186 is fixed, for example, to at least one side plate of the hanger 142 by suitable means, such as welding or fastening. As illustrated in FIG. 8, the engagement member 186 is a bent piece, or welded pieces, of sheet steel that is welded preferably to both side plates of the trailing arm beam 144.

Contact of the bumper 182 against the engagement member 186 positively prohibits, prevents or limits further pivotal movement about the axis A of the rear or second end portion 160 of the trailing arm beam 144 about the bushing assembly 148 in a downward direction PD, or clockwise as viewed in FIGS. 9-10, at a predetermined extension limit of the trailing arm beam. The limited pivotal movement in the downward direction of the rear or second end portion 160 of the trailing arm beam 144 and axle 162 may avoid potential damage to the air spring 164 and/or other components of the axle/suspension system 120 in certain situations such as when the heavy-duty vehicle, such as a trailer, is lifted onto a railroad car, during reverse braking, during repositioning of a slider, or when the axle/suspension system suddenly drops downwardly or, as a result of a pothole.

Contact of the bumper 182 against the engagement member 186 along with the mass of the trailing arm beam 144 and axle 162 exposes the bushing 150 of the bushing assembly 148 to forces or loading in a direction other than the previous mostly vertical V and horizontal H directions that were applied to prior art bushings. The bumper 182 may be formed from any suitable material having sufficient rigidity and durability, such as synthetic polymers, elastomers, composites, natural rubber, synthetic rubber or a mixture of natural and synthetic rubbers. It is to be understood that bumper 182 may also be formed of metal or metal composite materials. The bumper 182 may be generally cylindrical or frustoconical in shape and may include a depression or opening through which a fastener (not shown) may be inserted to attach the bumper to the extension 184. Alternatively, other appropriate connectors or attachment means may be used to attach the bumper 182 to the extension 184. The engagement structure or member 186 may be made for any suitable material, such as steel, and welded to at least one side plate of the hangers 142.

The configuration and relative positioning of the bumper 182 and the engagement member 186 determine the amount of downward pivotal movement of the trailing arm beam 144 and the axle 162. Preferably, of downward pivotal movement of the trailing arm beam 144 and the axle 162 is limited to no more than about 12° or about 4 inches from a ride height of the heavy-duty vehicle. The ride height is a static distance from the bottom of a frame member 122 to the center of the axle 162. It is contemplated that the bumper 182 and/or engagement member 186 may have structure that is adjustable in order to customize the amount of travel of the trailing arm beam 144 and the axle 162 to be limited for a particular heavy-duty vehicle. Alternatively, the engagement member 186 may be a separate component that is attached to the frame member 122 or any component, surface or structure that is fixed to the frame member.

The bumper 182 contacts the engagement member 186 to limit clockwise downward pivotal movement PD of the trailing arm beam 144, as illustrated in FIG. 10, and functions to resist compressive forces. With the bumper 182 contacting engagement member 186 and the trailing arm beam 144 and axle 162 pivoted to their travel limit in those certain situations, a radially compressive force F2 is applied to the bushing assembly 148 by the mass of the trailing arm beam and axle attempting to pivot further clockwise or downwardly. The force F2 is applied to the bushing assembly 148 in a force application direction D that is angularly spaced from horizontal H and vertical V directions relative to an axis of rotation or longitudinal central axis A of the bushing assembly 148. The force application direction D extends at an angle N in the range from about from 10° to about 20°, and preferably about 15° above, or counterclockwise from, the horizontal plane H. A force F1 is concurrently applied by the bumper 182 to the engagement member 186 as the extension portion 184 of the trailing arm beam 144 attempts to rotate further clockwise in the upward pivotal direction PU about the axis A. Thus, the limited movement in the clockwise downward pivotal direction PD of the trailing arm beam 144 and axle 162 of the heavy-duty vehicle assists in avoiding potential damage to the air spring 164 and/or other components of the axle/suspension system 120.

Figure 11:
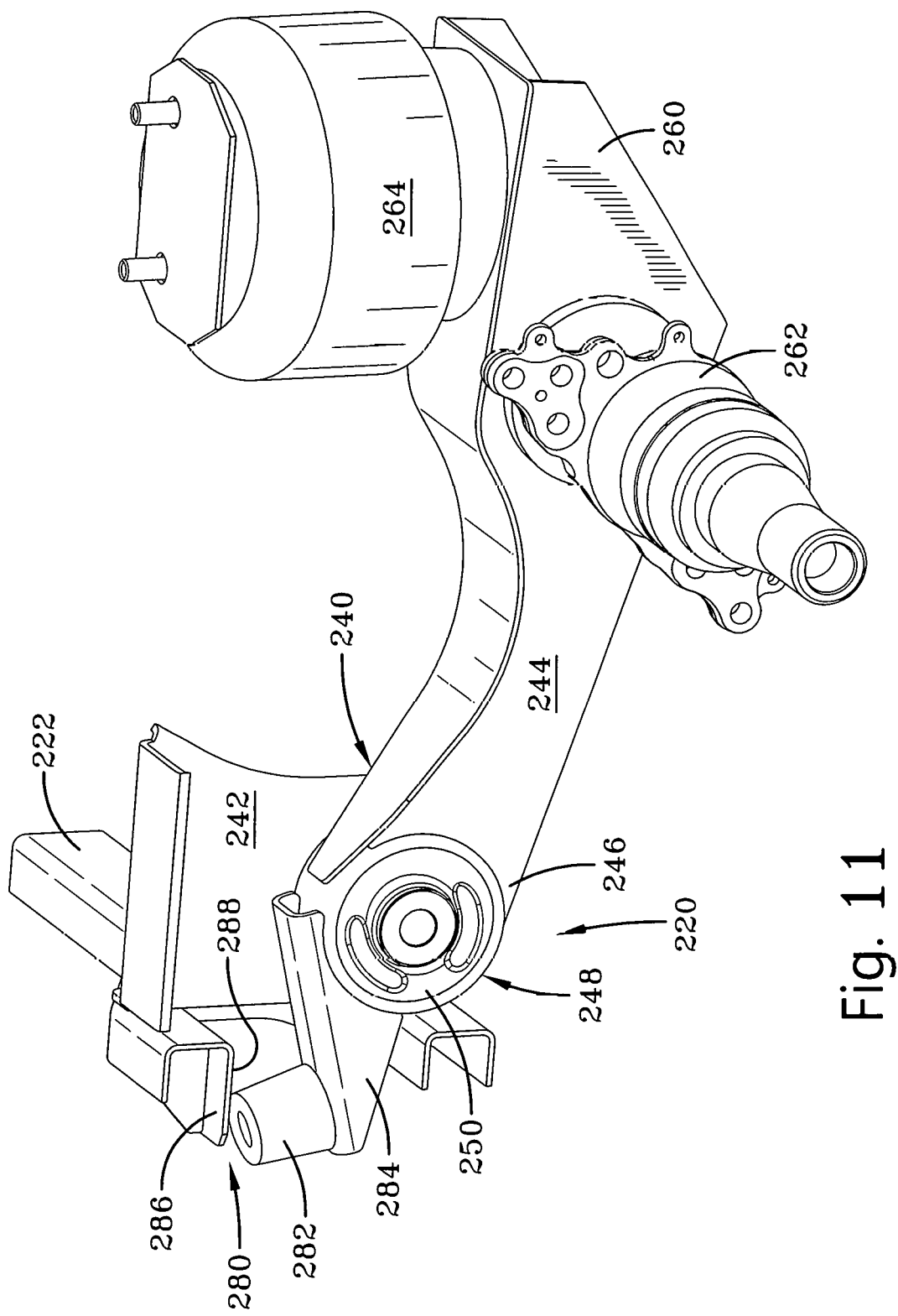
FIG. 11 is a perspective view of a portion of an exemplary axle/suspension system, constructed according to another aspect with components in one relative position.
Figure 12:
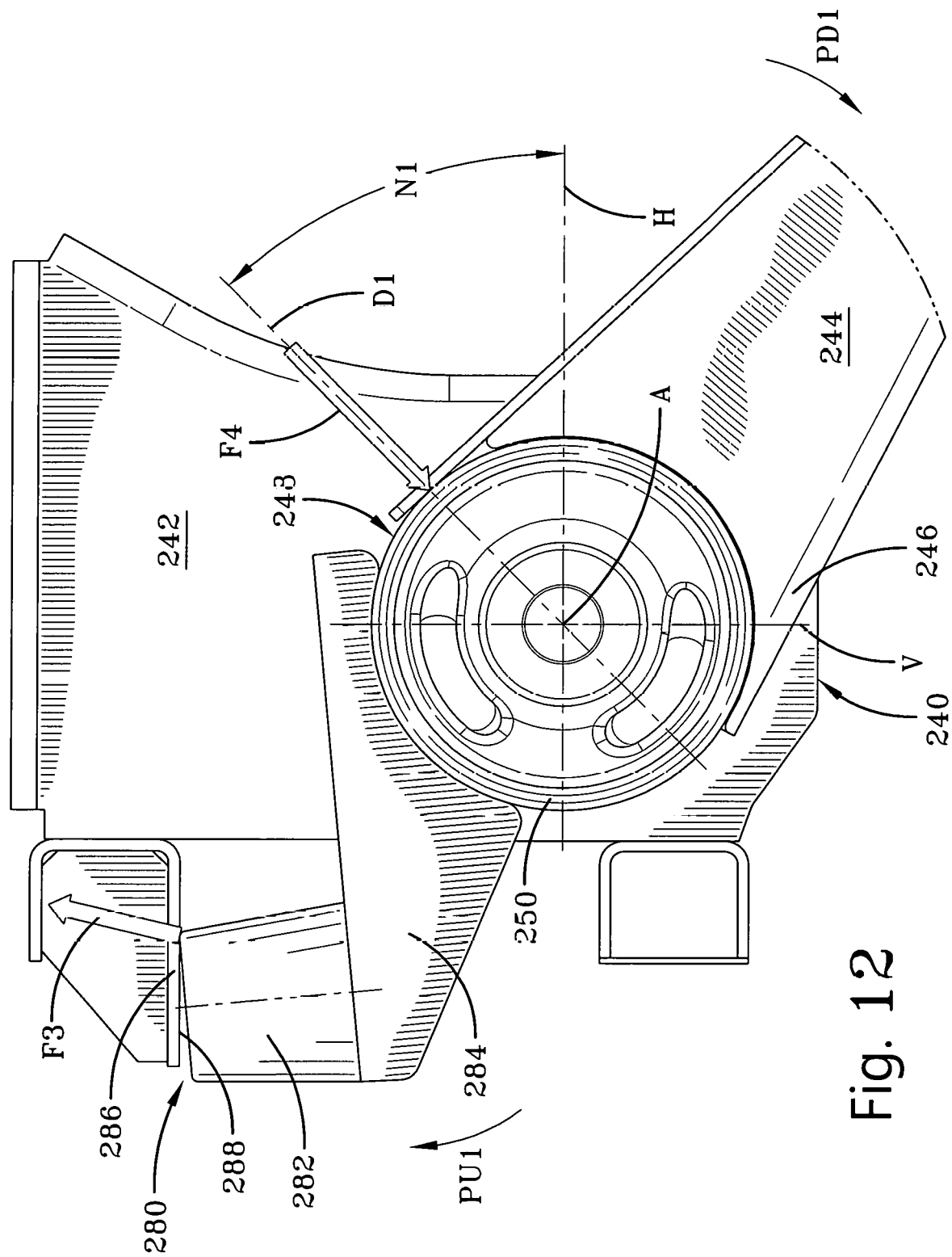
FIG. 12 is an enlarged fragmentary side elevation view of the portion of the axle/suspension system illustrated in FIG. 11, with components in another relative position.

A portion of a trailing arm beam-type air-ride axle/suspension system 220, according to another aspect of the present subject matter, is shown in FIGS. 11-12. The axle/suspension system 220 is typically mounted to a frame or frame members, generally indicated by reference numeral 222, of a heavy-duty vehicle (not shown). The axle/suspension system 220 generally includes a pair of substantially identical and mirror image suspension assemblies 240. For sake of clarity and brevity only one of the suspension assemblies 240 will be described. It is understood that the description of one suspension assembly 240 will equally apply to both suspension assemblies.

Each suspension assembly 240 includes a hanger 242 having two hanger portions or side plates (one hanger portion or side plate is removed from the drawings for illustrative purposes) fixed to the frame or frame member 222. The suspension assembly 240 also includes a trailing arm beam 244 that is pivotally connected to the hanger 242. The trailing arm beam 244 is made having an inverted general U-shape cross-section with a pair of laterally spaced sidewalls and a connecting portion. A plate may be fixed to an open portion of the trailing arm 244 to close it.

The trailing arm beam 244 includes a front or first end portion 246 having a bushing assembly 248 to provide a pivotal connection of the trailing arm beam to the hanger 242. The trailing arm beam 244 pivots relative to the hanger 242 about the bushing assembly 248 at a pivot joint with an axis A of rotation (FIG. 12). The bushing assembly 248 includes a bushing 250 essentially identical to the bushing 150 described above, a pivot bolt (not shown), nut (not shown) and washers (not shown) as is known, to accommodate relative pivotal connection of the trailing arm beam 244 with the hanger 242. The trailing arm beam 244 also includes a rear or second end portion 260. A portion of the transversely extending axle 262 is received and supported by the trailing arm beam 244 near the rear or second end portion 260, and is fixed to the trailing arm beam by suitable means such as welding or fastening.

The axle/suspension system 220 also includes an air spring 264 that is mounted to, and extends between, the rear or second end portion 260 of the trailing arm beam 244 and the frame member 222, as is known. The air spring 264 establishes a relative position between the trailing arm beam 244 and the frame member 222 of the heavy-duty vehicle as a function of fluid pressure within the air spring. The air spring 264 may also be designed and constructed to provide damping characteristics.

The axle 262 is supported by the trailing arm beam 244 on a first or right side, as viewed in FIG. 11, of the pivot joint. The axle 262 is supported by an intermediate portion of the trailing arm beam 244 between the bushing assembly 248 and the rear or second end portion 260 of the trailing arm beam 244. The axle 262 may be supported by the trailing arm beam 244 adjacent the rear or second end portion 260 of the trailing arm beam 244.

A new positive mechanical down-stop 280 includes a bumper 282, an extension portion 284 and an engagement member 286. The bumper 282 is fixed to the extension portion 284 of the trailing arm beam 244. The extension portion 284 is located on a second side of the pivot joint at bushing assembly 248 opposite the front or first end portion 246 of the trailing arm beam 244. The extension portion 284 of the trailing arm beam 244 may be a separate component that is permanently attached to the trailing arm beam by suitable means, such as welding, or may be integrally formed as one piece with the trailing arm beam.

The bumper 282 is normally spaced from contact with any component of the frame member 222 and hanger 242 of the heavy-duty vehicle when the trailing arm beam 244 and axle 262 are at a neutral ride height, as illustrated in FIG. 11. The extension portion 284 pivots clockwise in the upward pivotal direction PU and the bumper 282 contacts and engages a surface 288 of a component 286 or of a component associated with at least one of the frame member 222 and hanger 242, to limit further pivotal movement of the trailing arm beam 244 and axle 262 in a clockwise or downward direction about the bushing assembly 248, as best seen in FIG. 12. Thus, the limited pivotal movement in the downward direction of the trailing arm beam 244 and axle 262 of the heavy-duty vehicle assists in avoiding potential damage to the air spring 264 and axle/suspension system 220 when the heavy-duty vehicle, such as a trailer, is lifted onto a railroad car, during reverse braking, during repositioning of a slider, or when the axle/suspension system suddenly drops downwardly, as a result of a pothole, or other road hazard.

The down-stop structure 280 of the suspension assembly 240 includes the engagement member 286 having the surface 288 for contact by bumper 282 to limit movement in the downward pivotal direction PD of the trailing arm beam 244 and axle 262 in the downward or clockwise direction. The engagement member 286 may be a separate component or surface that is attached to at least one portion of the hanger 242 or frame member 222 or may be a portion of the hanger or frame itself. The surface 288 of the engagement member 286 may be in the form of a flat piece of metal fixed to and reinforcing the frame member 222 where the bumper 282 may engage. In the illustrated example, the bumper 282 is attached directly to the extension portion 284 of the trailing arm beam 244. It is contemplated that the bumper 282 may be attached directly to a frame member 222 or even hanger 242 and the engagement surface 288 provided on the extension portion 284 of the trailing arm beam 244. The configuration and relative positioning of the bumper 282 and the surface 288 of the engagement member 286 determine the amount of downward or clockwise pivotal movement of the trailing arm beam 244 and the axle 262 to no more than about 12°, or about 4 inches from a ride height of the heavy-duty vehicle. It is contemplated that the bumper 282 and/or engagement member 286 may have components that enable at least one of them to be adjusted to customize the travel to be limited for a particular heavy-duty vehicle application.

Figure 18:
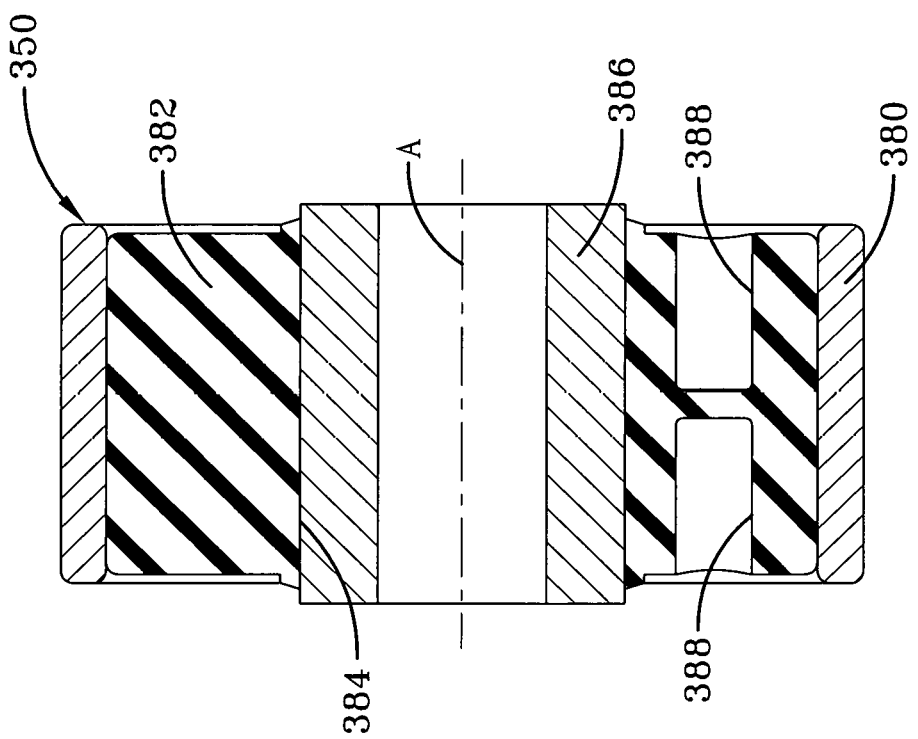
FIG. 18 is a cross-sectional view of the bushing of FIGS. 13-14, taken approximately along a plane indicated by the line 18-18 in FIG. 14.

The bumper 282 contacts the surface 288 of the engagement member 286 to limit pivotal movement of the trailing arm beam 244 in the clockwise direction about the axis A of the bushing assembly 248. With the bumper 282 moving in the upward pivotal direction PU and contacting engagement member 286, and the trailing arm beam 244 and axle 262 moving in the downward pivotal direction PD, a force F4 is applied to the bushing assembly 248 trying to compress a right portion, as viewed in FIG. 12, within the bushing 250 of the bushing assembly. The force F4 is applied to the bushing 250 along a force application direction D1 that is angularly spaced from horizontal and vertical directions relative to the axis A of the pivot connection. The force application direction D1 may extend at an angle N1 in a range from about from 33° to about 55°, and preferably about 44° upward or counter-clockwise relative to a horizontal plane H. The bushing 250 is still substantially solid along the force application direction because the bushing material located axially between axially opposite voids in the bushing, such as voids 388 illustrated in FIG. 18, is still present. The axial extent of the voids 388 may be of any suitable depth to provide a desired amount of stiffness or resistance to compression. Thus, the bushing 250 can have sufficient stiffness resisting the application of this new application force F4. A force F3 is concurrently applied by the bumper 282 to the engagement member 286. The force application direction D1 for down-stop bumper 282 may be different than the force application direction D for down-stop bumper 182.

A bushing 350 (FIGS. 13-19), representative of the bushing 150 or 250, may be incorporated into respective bushing assembly 148 or 248 regardless of the type of down-stop bumper 182 or 282 and engagement member 186 or 286 that are employed in the axle/suspension system 120, 220. The bushing 350 is common to both types of the new positive mechanical down-stop structures 180 or 280. The bushing 350 is the same as bushing 150 or 250 and will be described in more detail. Any description of the bushing 350 will apply equally to bushing 150 or 250.

The bushing 350 includes a beam mounting sleeve 380 (FIGS. 13-19) which may be welded to a portion of the front or first end portion 146, 246 of the trailing arm beam 144, 244. The beam mounting sleeve 380 is made of any suitably strong metal, such as steel. The beam mounting sleeve 380 may have a constant diameter tubular cross-section taken perpendicular to the longitudinal central axis A of the bushing 350. A pair of alignment collars (not shown) may usually be mounted in respective slots (not shown) formed in a sidewall of the hanger 142, 242 to align beam mounting sleeve 380 within the hanger.

An elastomeric bushing body 382 is press-fit into the beam mounting sleeve 380. The bushing body 382 is elastomeric and generally cylindrical-shaped. The bushing body 382 is formed with a central opening 384 (FIGS. 13-19) that may pass completely through the bushing body about the axis A. A rigid metal sleeve 386 is positioned in the opening 384 of the bushing body 382 and retained in the bushing body by any suitable method, such as with an adhesive or mold-bonding. The sleeve 386 may have a constant diameter tubular cross-section taken perpendicular to the longitudinal central axis A. The sleeve 386 is made of any suitable hard metal, such as steel. The combined structure of the bushing body 382 and metal sleeve 386 is press fit into the beam mounting sleeve 380. The sleeve 386 mounts the bushing assembly 148, 248 to the hanger 142, 242 by passing a bolt (not shown) through the sleeve and a pair of suitable plastic wear pads and washers (not shown) and fastening a nut (not shown) on the bolt.

A pair of spaced-apart generally arcuate or kidney-shaped cavities or voids 388 may be formed in each side of the bushing body 382, as viewed in FIGS. 13-19. The cavities or voids 388 provide multi-functional characteristics of the bushing 350. The cavities or voids 388 may be of any suitable shape, size and/or orientation, depending on a particular application in which the bushing 350 will be used. The cavities or voids 388 may be of different shapes, sizes, locations and/or orientations, if an application requires such differentiation. Each of the cavities or voids 388 is formed in respective top and bottom portions (as viewed in FIGS. 13-14) on both axial sides of the bushing body 382 and circumferentially spaced. By way of example, the voids 388 may not extend axially completely through the bushing body 382, as illustrated in FIG. 18, but it is contemplated that they may. The bushing body 382 is made from natural rubber, synthetic rubber or a mixture of natural and synthetic rubbers. The bushing body 382 may have a durometer in the range of from about 50H to about 90H International Rubber Hardness Degrees (IRHD), and preferably from about 65H to about 75H, depending upon the GAWR of the axle/suspension system 120, 220.

Figure 13:
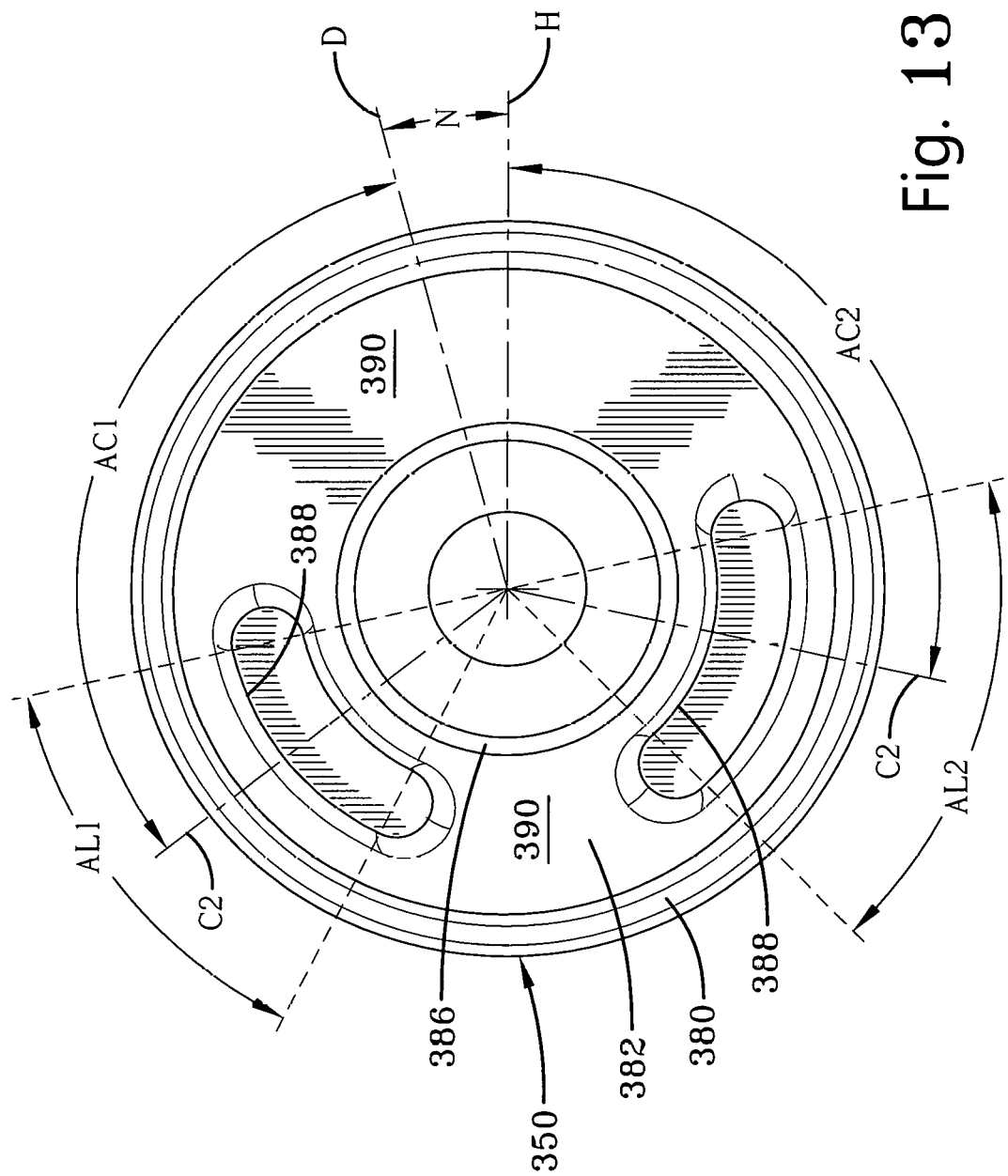
FIG. 13 is an enlarged side elevation view of a bushing for incorporation into the axle/suspension system illustrated in FIGS. 6-12.
Figure 14:
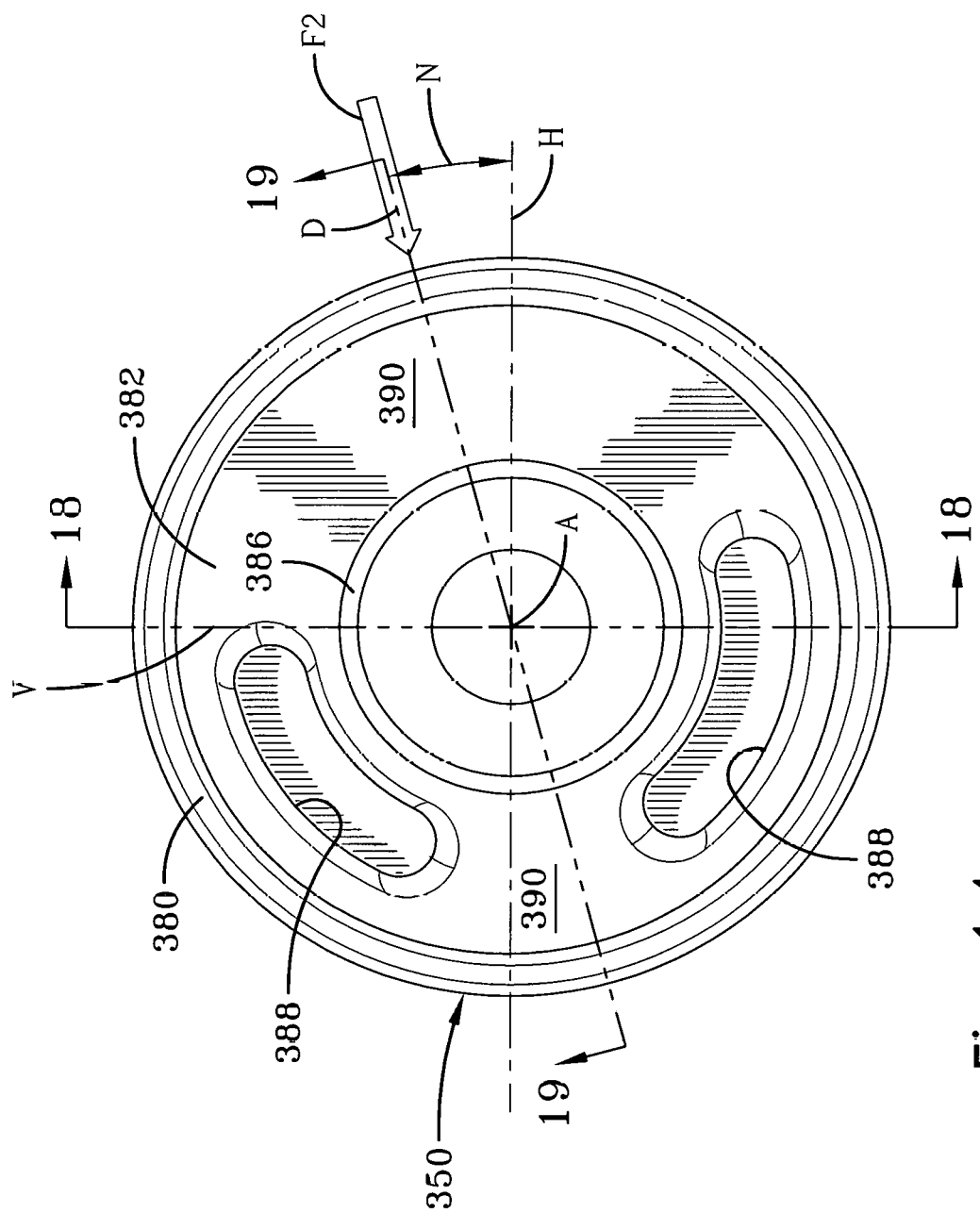
FIG. 14 is an enlarged side elevation view of the bushing of FIG. 13, illustrating a direction in which forces are applied when the new positive down-stop mechanism is engaged in its limiting condition.
Figure 15:
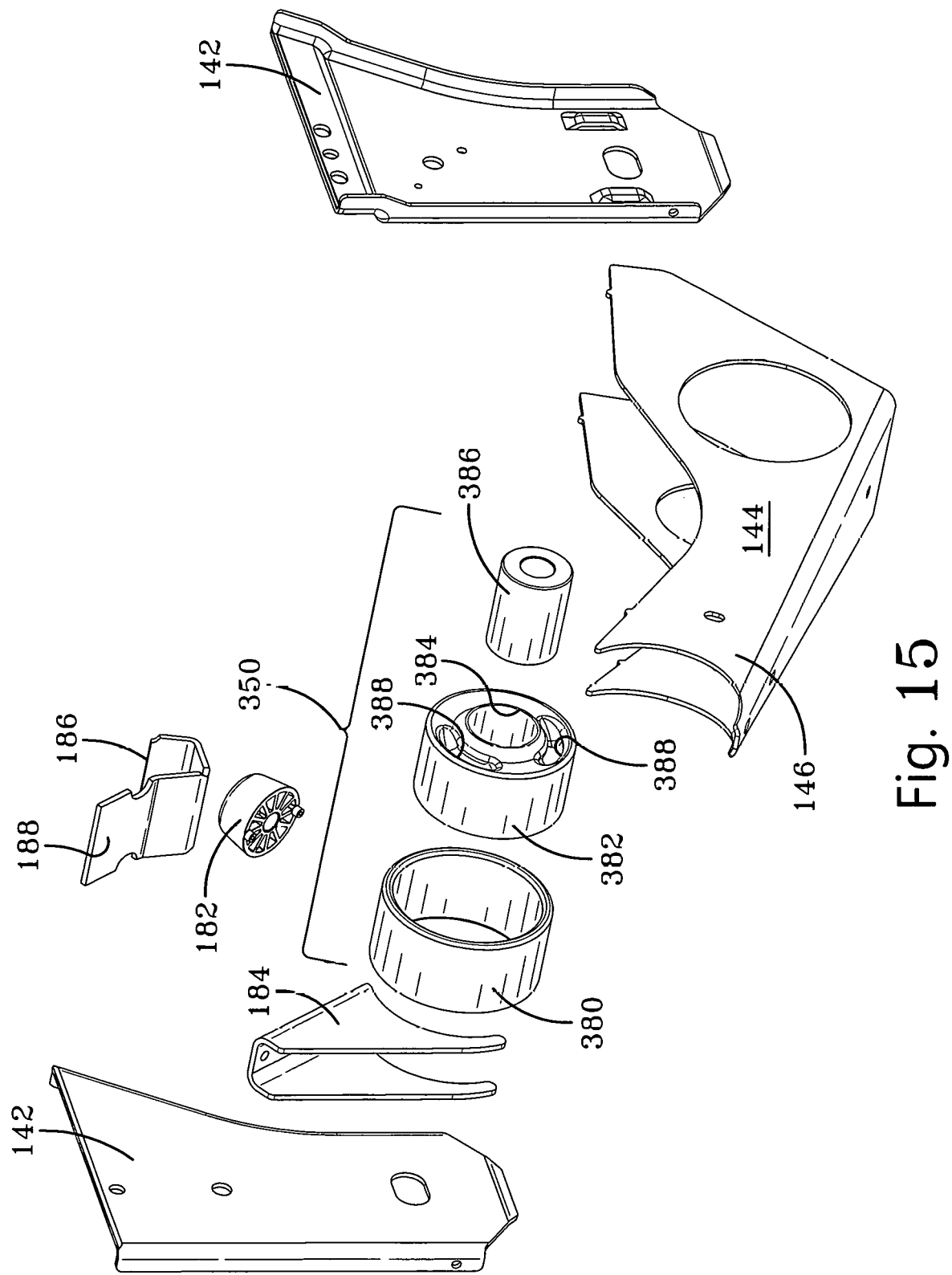
FIG. 15 is an exploded perspective view of a hanger, beam, down-stop structure and bushing of the axle/suspension system illustrated in FIGS. 7-10.
Figure 16:
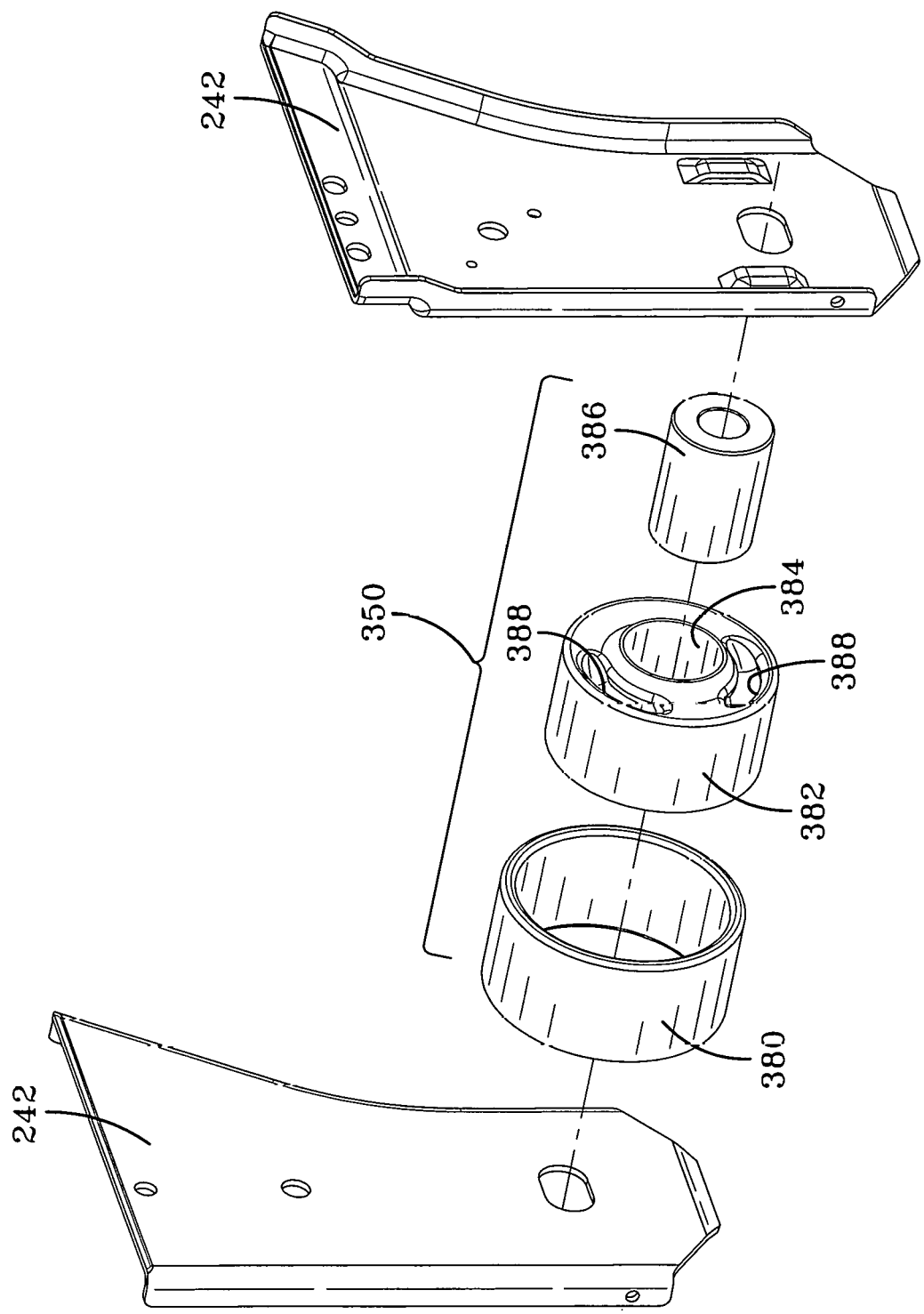
FIG. 16 is an enlarged exploded perspective view of the hanger and bushing illustrated in FIG. 15.
Figure 17:
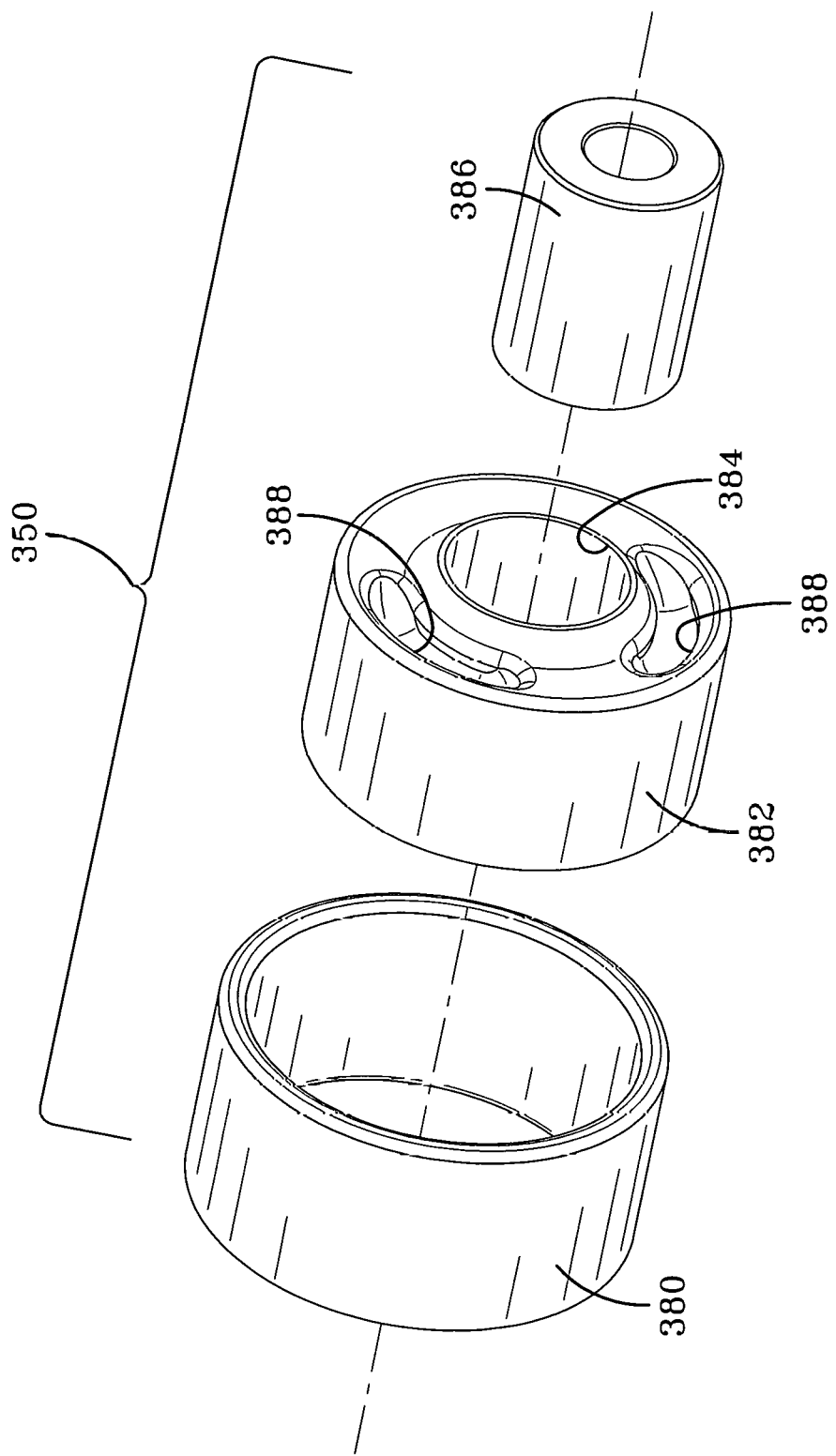
FIG. 17 is an enlarged exploded perspective view of the bushing illustrated in FIGS. 15 and 16.
Figure 19:
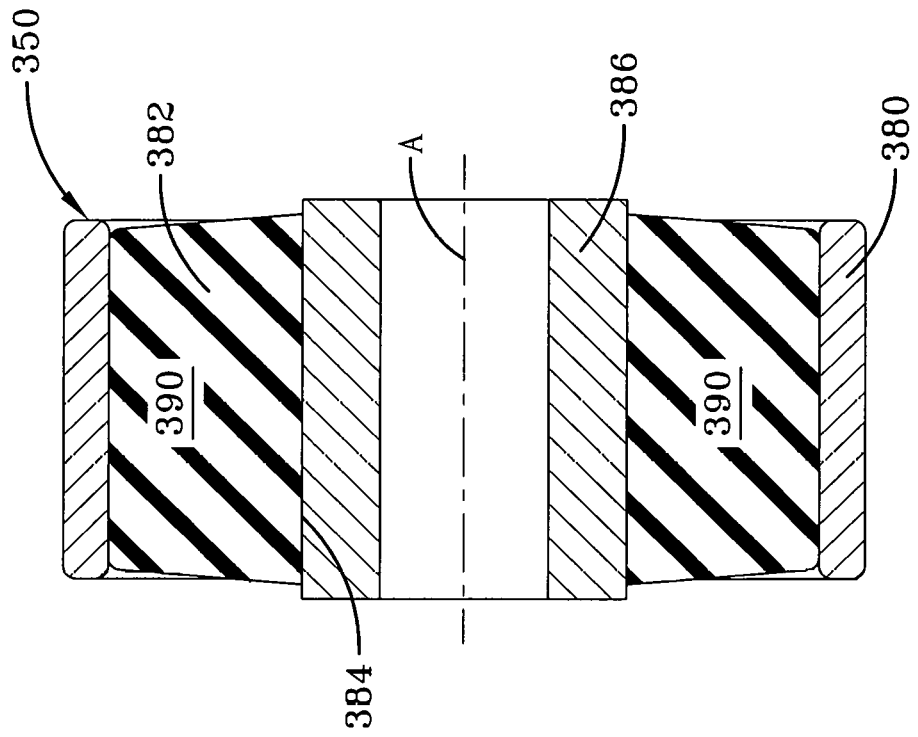
FIG. 19 is a cross-sectional view of the bushing of FIGS. 13-14, taken approximately along a plane indicated by the line 19-19 in FIG. 14.

The cavities or voids 388 may have respective arcuate centers or midpoints C2 (as viewed in FIGS. 13-14). The force application direction D extends above horizontal H at an angle N through the axis A. An angular spacing AC1 from the force application direction D to the center or midpoint C2 of the upper cavity or void 388 may be in the range from about 90° to about 140°, or preferably from about 95° to about 135° and more preferably about 115°. An angular spacing AC2 from horizontal H to the center C2 of the lower cavity or void 388 may be in the range from about 70° to about 130°, or preferably from about 95° to about 135° and more preferably about 100°. The centers or midpoints C2 of the cavities or voids 388 are spaced apart in the range from about 185° to about 265° and preferably about 225° (defined as N+AC1+AC2).

An arcuate extent of the circumferentially extending arcs AL1 and AL2 (FIG. 13) of the continuously uninterrupted majority of each cavity or void 388 may be in the range from about 60° to about 90° and preferably about 75°. Each of the arcuate extents AL1, AL2 of the cavities or voids 388 is centered or symmetrical relative to its respective center or midpoint C2. The arcuate extents AL1, AL2 of the voids 388 may be different from one another. At least one of the cavities or voids 388 may be located along the vertical direction V when the bumper 182, 282 contacts the respective engagement member 186, 286. The placement and size of at least one of the cavities or voids 388 located near or in the bushing body 382 along the vertical direction V provides a relatively compliant and elastically resilient bushing body that enables the axle/suspension system 220 to absorb and accommodate vertical loading or forces.

The bushing body 382 has substantially solid portions 390 located between the cavities or voids 388. The solid portions 390 of the bushing body 382 are located on both sides of the axis A and between respective cavities or voids 388, as illustrated in FIGS. 13-14. The solid portions 390 of the bushing body 382 are mainly located along the force application direction D to provide desired stiffness or resistance to deformation in the force application direction. The solid portions 390 of the bushing body 382 may also be located along the horizontal direction H to accommodate and absorb horizontal loading or forces.

The bushing body 382 of the bushing 350, thus, provides desired stiffness or first resistance to deformation in the vertical direction V, in the horizontal direction H and in the force application direction D. The bushing body 382 of the bushing 350 is relatively stiffer with a second resistance to deformation in the horizontal direction H (FIG. 14) than in the vertical direction V when the axle/suspension system 120, 220 is subjected to horizontal and vertical loads, respectively, during operation of the heavy-duty vehicle. The multi-functional characteristics of bushing 350 include required load and deflection ratios, or static rates, of varying levels in different directions, including vertical V, horizontal H, axial A and force application D, for heavy-duty vehicle axle/suspension system applications.

The relatively stiff or deformable property in the radially horizontal direction H is due to the substantially solid portion 390 of the bushing body 382 extending along the horizontal direction. The relatively hard stiffness in the horizontal direction H of the bushing body 382 accommodates and absorbs fore-aft forces due to horizontal loading that may be caused by acceleration, deceleration and braking of the heavy-duty vehicle. This aids the axle/suspension system 120, 220 remaining substantially perpendicular to the direction of movement of the vehicle despite horizontal loading which may be placed on the suspension system. The relatively less stiff or compliant property in the vertical direction V due to the placement and size of the voids 388 in the bushing body 382 enables the axle/suspension system 120, 220 and bushing 350 to accommodate and absorb vertical loading shocks and provide proper roll-stability for the trailer. The relatively stiffer or less deformable property in the force application direction D of the bushing body 382 enables the bushing 350 to accommodate, absorb and react to forces in the force application direction when components of the new positive mechanical down-stop are engaged or in a relative position to limit downward pivotal movement of the trailing arm beam and axle. Bushing body 382 and bushing 350 also reacts satisfactorily to lateral or axial forces due to sway or roll of the heavy-duty vehicle.

A bushing 450 (FIGS. 20-23), constructed according to another aspect, may be incorporated into both types of axle/suspension systems 120, 220 utilizing the new positive mechanical down-stop structures 180, 280 respectively, as illustrated in FIGS. 7-12. The bushing 450 includes a tubular outer beam mounting sleeve 480 which can be welded to a portion of the front or first end portion 146, 246 of the trailing arm beam 144, 244 of suspension assemblies 140, 240. The beam mounting sleeve 480 is made of any suitably strong metal such as steel.

An elastomeric bushing body 482 is press-fit into the beam mounting sleeve 480. The bushing body 482 is elastic and generally cylindrical-shaped. The bushing body 482 is formed with a central opening 484 (FIG. 22) that passes completely through the bushing body substantially along an axis A about which the beam 144, 244 may pivot.

A rigid inner sleeve 486 may be press fit and/or friction fit in the opening 484 of the bushing body 482 and may be bonded to the bushing body at a peripheral outer surface of the sleeve by any suitable adhesive. The sleeve 486 may be made of any suitably strong metal, such as steel. The sleeve 486 mounts the bushing 450 to the hanger 142, 242 by passing a bolt (not shown) through both portions of the hanger, the sleeve and a pair of suitable plastic wear pads and washers (not shown).

Figure 21:
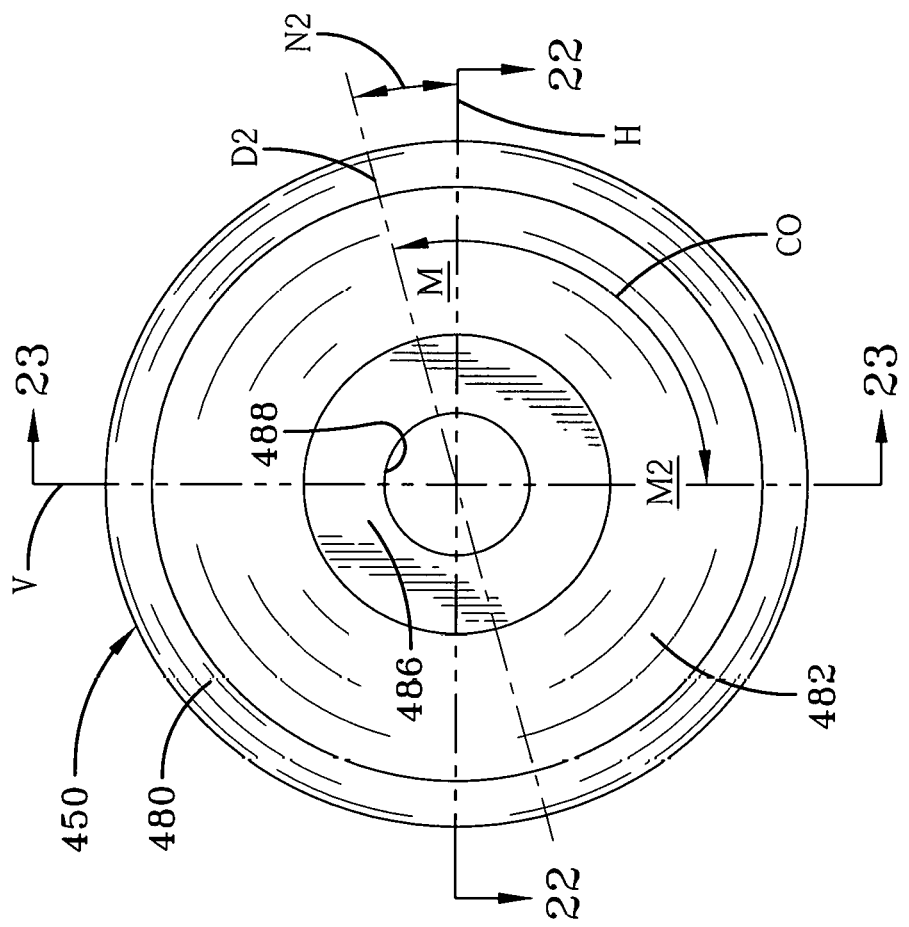
FIG. 21 is an enlarged side elevation view of the bushing illustrated in FIG. 20.
Figure 20:
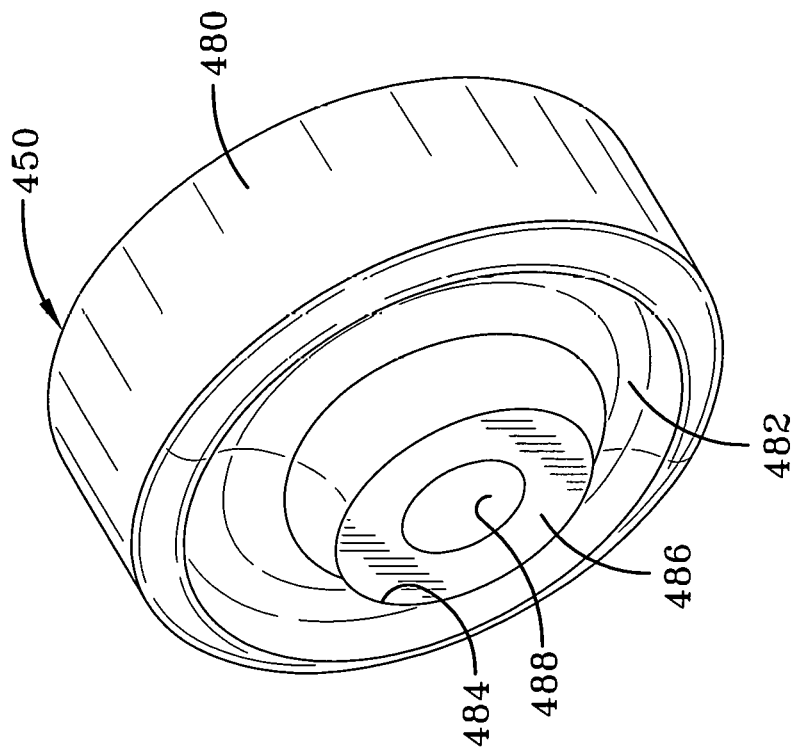
FIG. 20 is an overall perspective view of a bushing according to another aspect.

A force is applied to the bushing 450 along a force application direction D2 that is angularly spaced from the horizontal direction H and the vertical direction V. The force application direction D2 may extend at a suitable angle N2 in a range, for example, from about from 10° to about 20°, and preferably about 15° upward or counter-clockwise relative to the horizontal direction H. The sleeve 486 features a variable dimension tubular cross-section taken perpendicular to the axis A, as illustrated in FIG. 22. The sleeve 486 has a first intermediate portion M with a first outer dimension OM. The first intermediate portion M is located between axially opposite end portions E that each have an outer dimension OE1. The first outer dimension OM is greater than the outer dimension OE1. The first intermediate portion M is preferably located along the force application direction D2 (FIG. 21). It is also contemplated that at least a portion of the first intermediate portion M is located along the horizontal direction H. The bulbous configuration of the sleeve 486 enables the use of relatively thinner elastomeric material radially outward of intermediate portion M of the bushing body 482, so there is less material to deform resulting in a relatively overall stiffer property in those regions and radial directions.

The sleeve 486 also may have a second intermediate portion M2 (FIG. 23) located between the axially opposite end portions E. The second intermediate portion M2 has an outer dimension OE2 substantially equal to the outer dimension OE1 of the end portions E shown in FIG. 22. The second intermediate portion M2 is circumferentially offset at least in one direction from the first intermediate portion M by an angle CO (FIG. 21). The angle CO may be in the range from about 45° to about 135°, and preferably about 90°. There is relatively more elastomeric material radial outward of the second intermediate portion M2 to deform resulting in a relatively less stiff property in those regions and radial directions.

The first intermediate portion M of the sleeve 486 has a first inside dimension IM (FIG. 22) and the axially opposite end portions E each have a second inner dimension IE. The first inner dimension IM is greater than the second inner dimension IE. The second intermediate portion M2 (FIG. 23) of the sleeve 486 has an outer dimension OE2 that is substantially constant over its entire axial extent. The second intermediate portion M2 of the sleeve 486 may have an inner surface 488 that has a substantially constant inner dimension IM2 or that may vary a relatively slight amount as illustrated in FIG. 22. The inner dimension IM2 is smaller than the inner dimension IM of the bulbous first intermediate portion M.

The bushing body 482 is preferably made from natural rubber, synthetic rubber or a mixture of natural and synthetic rubbers. The bushing body 482 may have a durometer in the range of from about 50H to about 70H International Rubber Hardness Degrees (IRHD), depending upon the GAWR of the axle/suspension system 120, 220. The durometer of the bushing body 482 in bushing 450 is relatively less than that of the bushing body 382 in bushing 350 for the same GAWR. The durometer or stiffness of the bushing body 482 can be relatively lower due to the unique structure of the sleeve 486 accommodating and absorbing the forces applied in the force application direction D.

The bushing 450 provides required stiffness or resistance to deformation in the vertical direction V, horizontal direction H and the force application direction D2. The bushing 450 is relatively stiffer or resistant to deformation in the force application direction D2 and horizontal direction H (FIG. 21) than in the vertical direction V due to the shape of the sleeve 486 and positioning of the intermediate portion M. The multi-functional characteristics of the bushing 450 include required load and deflection ratios, or static rates, of varying levels in different directions for heavy-duty vehicle axle/suspension system applications. The bushing 450 can meet the required load capacity, deflection resistance and deflection compliance in the vertical V, horizontal H and force application D2 directions as well as in the lateral or axial direction without any voids in the bushing body 482 due mainly to the sleeve 486 having a variable cross-section and the ability to incorporate a relatively softer bushing body material.

The bushing 450 being relatively stiff or resistant to deformation in the force application direction D2 enables the bushing to accommodate forces when the new positive mechanical down-stop 180, 280 is engaged to limit downward pivotal movement of the trailing arm beam 144, 244 and axle 162, 262. The relatively hard stiffness of the bushing 450, at least partially in the horizontal direction H, is due to the first intermediate portion M of the sleeve 486 also extending along the horizontal direction H. The relative softness or deformability of the bushing 450 in the vertical direction V is due to the second intermediate portion M2 of the sleeve 486 being positioned in the vertical direction, and the ability to select a relatively soft rubber compound throughout the entire bushing body 482 or possibly incorporating a dual durometer material. The sleeve 486 may be made from any suitable material or combination of suitable materials and by any suitable process. Thus, the bushing 450 enables the axle/suspension system 120, 220 to absorb vertical loading shocks and provide proper roll-stability for the heavy-duty vehicle.

In the description, certain terms have been used for brevity, clarity and understanding. No unnecessary limitations are to be implied from those terms beyond the requirements of the prior art because such terms are used for descriptive purposes and are intended to be broadly construed. Moreover, the description and illustration of the disclosed subject matter is by way of example, and the scope of the present subject matter is not limited to the exact details shown or described. The bushing of the disclosed subject matter could be utilized on various types of axle/suspension systems for heavy-duty vehicles and with other types of air-ride beam-type axle/suspension systems that may be utilized on trucks, tractors, trailers, or other heavy-duty vehicles. The bushing could be utilized with other types of down-stop structures. The bushing may be made from other materials and have different shapes, and sizes. The bushing may be utilized on axle/suspension systems having either a trailing arm or leading arm configuration and utilized on various types of heavy-duty vehicle frames or sub-frames that mount axle/suspension systems without changing the overall concept or operation of the present subject matter. It is also contemplated that the down-stop bumper may be attached to the frame, the hanger or the beam and be adapted to contact a component associated with another of the frame, hanger or beam to limit pivotal movement of the beam and axle. It is further contemplated that the bushing of the present subject matter can be used on heavy-duty vehicles having various GAWRs, Certain terminology may be used for purposes of reference only and is not intended to be limiting. For example, terms such as "downward" and "below" refer to directions in the drawings to which reference is made. Terms such as "front", "rear", "forward", "rearward", "right", "downward", "upward" "longitudinal" and "transverse", may describe the orientation of portions or components within a reference to the text and the associated drawings. Such terminology may include the words specifically mentioned above, derivatives thereof, and words of similar import. Similarly, the terms "first", "second" and other such numerical terms referring to structures do not imply a sequence or order unless clearly indicated by the context.

Although the description has been shown and described with respect to one or more aspects, applications or implementations, it may occur to those skilled in the art based upon a reading and understanding of this description and the drawings that equivalent alterations and modifications may be made without detracting from the spirit and scope of the aspects or implementations in the description. The description and claims intended to include all such modifications and alterations.

What is claimed is:

1. An axle/suspension system including a pair of suspension assemblies for a heavy-duty vehicle, each of the suspension assemblies being supported by and connected to a frame of the heavy-duty vehicle, the axle/suspension system including an axle, the axle/suspension system comprising:
   a hanger connected to the frame of the heavy-duty vehicle;
   a beam mounted at a pivot connection to the hanger for relative pivotal movement, the pivot connection having an axis of rotation, a portion of the axle being attachable to the beam on a first side of the pivot connection;
   bumper structure fixed to the beam located on an opposite second side of the pivot connection, the bumper structure for contacting a component associated with the hanger to limit pivotal movement of the axle in one direction about the pivot connection, wherein the contact applies a force to the pivot connection in a force application direction that is angularly spaced from horizontal and vertical planes extending through the axis of rotation; and
   the pivot connection including a bushing, the bushing including an elastomeric bushing body with at least one void extending axially for decreasing rigidity of the bushing body in a substantially vertical direction, wherein the at least one void is located in the bushing body angularly spaced from the force application direction and is substantially offset in a forward direction from vertical, and wherein the bushing body is substantially solid along the force application direction and in a rearward direction from vertical.

2. The axle/suspension assembly of claim 1 wherein the at least one void extends at least partially through the bushing body.

3. The axle/suspension assembly of claim 1 wherein an arcuate midpoint of the at least one void is spaced from the force application direction in a range from about 70° to about 140°.

4. The axle/suspension assembly of claim 1 wherein the bushing body includes two voids, each of the voids extends axially.

5. The axle/suspension assembly of claim 4 wherein at least one of the two voids extend at least partially through the bushing body.

6. The axle/suspension assembly of claim 4 wherein an arcuate midpoint of each of the voids is spaced in opposite directions from the force application direction in a range from about 70° to about 140°.

7. The axle/suspension assembly of claim 1 wherein the force application direction extends from a horizontal direction at an angle in a range from about 10° to about 20°.

8. A slider axle/suspension assembly for a heavy-duty vehicle, the axle/suspension assembly being operatively supported with a frame of the heavy-duty vehicle, the slider axle/suspension assembly comprising:
   a hanger connected to the frame of the heavy-duty vehicle;
   at least one trailing arm beam mounted at a pivot connection to the hanger for relative pivotal movement, the pivot connection having an axis of rotation;
   an axle supported by the trailing arm beam, the axle being supported by the trailing arm beam located on a first side of the pivot connection;
   a bumper fixed to the beam located on an opposite second side of the pivot connection, the bumper adapted to contact an engagement member associated with the hanger to limit pivotal movement of the axle in one direction and applying a force to the pivot connection in a force application direction extending through the axis of rotation of the trailing arm beam and that is angularly spaced from horizontal and vertical planes; and
   the pivot connection including a bushing to connect the trailing arm beam to the hanger for pivotal movement, the bushing includes an elastomeric bushing body with at least one void extending axially for decreasing rigidity of the bushing body in a substantially vertical direction, wherein the at least one void is located in the bushing body angularly spaced from the force application direction and is substantially offset in a forward direction from vertical, and wherein the bushing body is substantially solid along the force application direction and in a rearward direction from vertical.

9. The slider axle/suspension assembly of claim 8 wherein the at least one void extends at least partially through the bushing body.

10. The slider axle/suspension assembly of claim 8 wherein an arcuate midpoint of the at least one void is spaced from the force application direction in a range from about 70° to about 140°.

11. The slider axle/suspension assembly of claim 8 wherein the bushing body includes at least two voids, each of the voids extends axially.

12. The slider axle/suspension assembly of claim 11 wherein at least one of the at least two voids extends at least partially through the bushing body.

13. The slider axle/suspension assembly of claim 11 wherein an arcuate midpoint of each of the voids is spaced in opposite directions from the force application direction in a range from about 70° to about 140°.

14. The slider axle/suspension assembly of claim 8 wherein the force application direction extends from horizontal at an angle in the range from about 10° to about 20°.

15. A bushing assembly for use in an axle/suspension system of a heavy-duty vehicle, the axle/suspension system including a beam supporting an axle, the beam is supported at a pivot connection by a hanger of the heavy-duty vehicle for relative pivotal movement, a bumper is fixed to the beam and contacts an engagement member of the hanger to limit pivotal movement of the beam and axle in one direction and applies a force to the pivot connection in a force application direction that is angularly spaced from horizontal and vertical planes, the bushing assembly comprising:
   a bushing to connect the beam to the hanger at the pivot connection;
   an elastomeric bushing body of the bushing includes at least one void for decreasing rigidity of the bushing body in a substantially vertical direction;
   wherein the at least one void is located in the bushing body angularly spaced from the force application direction and is substantially offset in a forward direction from vertical;

the bushing body being substantially solid along the force application direction and in a rearward direction from vertical;

the bushing including an elongated tubular inner sleeve with an axially extending first intermediate portion of a first outside dimension, the first intermediate portion located between axially opposite end portions that each have a second outer dimension, and the first outer dimension being greater than the second outside dimension; and the tubular inner sleeve of the bushing further includes an axially extending second intermediate portion being located between the opposite end portions, the second intermediate portion having an outer dimension substantially equal to the second outside dimension, the second intermediate portion being circumferentially offset from the first intermediate portion.

16. The bushing assembly of claim 15 wherein the first intermediate portion of the tubular inner sleeve being located along the force application direction.

17. The bushing assembly of claim 15 wherein the second intermediate portion of the tubular inner sleeve of the bushing has a first inside dimension and the end portions each have a second inner dimension, the first inner dimension being substantially equal to the second inner dimensions.

18. The bushing assembly of claim 15 wherein the second intermediate portion of the tubular inner sleeve of the bushing has a first inside dimension and the end portions each have a third inner dimension, the first inner dimension being greater than the third inner dimensions.

19. A bushing assembly for use in an axle/suspension system of a heavy-duty vehicle, the axle/suspension system including a beam supporting an axle, the beam is supported at a pivot connection by a hanger of the heavy-duty vehicle for relative pivotal movement, a bumper is fixed to the beam and contacts an engagement member of the hanger to limit pivotal movement of the beam and axle in one direction and applies a force to the pivot connection in a force application direction that is angularly spaced from horizontal and vertical directions, the bushing assembly comprising:

a bushing to connect the beam and the hanger at the pivot connection, the bushing comprising:

a tubular sleeve;

an elastomeric bushing body disposed about the tubular sleeve, the elastomeric bushing body having a first resistance to deformation of the bushing in the vertical direction towards the location of the bumper;

structure providing a second resistance to deformation along the force application direction away from the location of the bumper, the second resistance to deformation being greater than the first resistance to deformation; and the structure providing the second resistance to deformation includes the tubular sleeve having a first intermediate portion with a first outside dimension, the first intermediate portion located between axially opposite end portions that each have a second outer dimension, the first outer dimension being greater than the second outside dimension and the first intermediate portion of the tubular sleeve being circumferentially located in the force application direction.

20. The bushing assembly of claim 19 wherein the structure with the first resistance to deformation of the bushing includes the elastomeric bushing body having at least one axially extending void angularly spaced from the force application direction to reduce the first resistance to deformation below the second resistance to deformation.

21. The bushing assembly of claim 19 wherein the structure with the second resistance to deformation of the bushing includes the elastomeric bushing body being substantially solid along the force application direction.

22. The bushing assembly of claim 19 wherein the tubular sleeve includes a second intermediate portion being located between the opposite end portions, the second intermediate portion having an outer dimension substantially equal to the second outside dimension, the second intermediate portion being circumferentially offset from the first intermediate portion and circumferentially located in the vertical direction.

* * * * *

UNITED STATES PATENT AND TRADEMARK OFFICE
CERTIFICATE OF CORRECTION

PATENT NO. : 10,703,155 B2
APPLICATION NO. : 15/999165
DATED : July 7, 2020
INVENTOR(S) : Donald R. Hester et al.

Page 1 of 1

It is certified that error appears in the above-identified patent and that said Letters Patent is hereby corrected as shown below:

In the Claims

Claim 2, Column 19, Line 42, after the term "axle/suspension" delete "assembly" and insert --system--.

Claim 3, Column 19, Line 45, after the term "axle/suspension" delete "assembly" and insert --system--.

Claim 4, Column 19, Line 49, after the term "axle/suspension" delete "assembly" and insert --system--.

Claim 5, Column 19, Line 52, after the term "axle/suspension" delete "assembly" and insert --system--.

Claim 6, Column 19, Line 55, after the term "axle/suspension" delete "assembly" and insert --system--.

Claim 7, Column 19, Line 59, after the term "axle/suspension" delete "assembly" and insert --system--.

Signed and Sealed this
Fifteenth Day of September, 2020

Andrei Iancu
*Director of the United States Patent and Trademark Office*